US00RE50570E

(19) United States
(12) Reissued Patent
Hong et al.

(10) Patent Number: US RE50,570 E
(45) Date of Reissued Patent: Sep. 2, 2025

(54) REFRIGERATOR

(71) Applicant: Samsung Electronics Co., Ltd., Suwon-si (KR)

(72) Inventors: Dae Jin Hong, Suwon-si (KR); Yong Woo Kim, Suwon-si (KR)

(73) Assignee: SAMSUNG ELECTRONICS CO., LTD., Suwon-si (KR)

(21) Appl. No.: 17/245,507

(22) Filed: Apr. 30, 2021

Related U.S. Patent Documents

Reissue of:
(64) Patent No.: 10,345,036
Issued: Jul. 9, 2019
Appl. No.: 15/110,213
PCT Filed: Jan. 7, 2015
PCT No.: PCT/KR2015/000157
§ 371 (c)(1),
(2) Date: Jul. 7, 2016
PCT Pub. No.: WO2015/105333
PCT Pub. Date: Jul. 16, 2015

(30) Foreign Application Priority Data

Jan. 7, 2014 (KR) ..... 10-2014-0002010
Jul. 16, 2014 (KR) ..... 10-2014-0089516

(51) Int. Cl.
*F25D 29/00* (2006.01)
*F25D 11/02* (2006.01)
(Continued)

(52) U.S. Cl.
CPC ..... *F25D 29/005* (2013.01); *F25D 11/022* (2013.01); *F25D 17/065* (2013.01);
(Continued)

(58) Field of Classification Search
CPC ..... F25D 17/065; F25D 17/04; F25D 17/045; F25D 17/06; F25D 17/062; F25D 23/062;
(Continued)

(56) References Cited

U.S. PATENT DOCUMENTS 2,944,410 A * 7/1960 Mann ..... F25D 23/04 62/289
3,004,401 A * 10/1961 Mann ..... F25D 17/065 62/156

(Continued)

FOREIGN PATENT DOCUMENTS

CN 1124056 A 6/1996
CN 1156238 A 8/1997

(Continued)

OTHER PUBLICATIONS

European Office Action dated May 16, 2023 in European Patent Application No. 20150463.6.

(Continued)

*Primary Examiner* — William V Gilbert
(74) *Attorney, Agent, or Firm* — STAAS & HALSEY LLP

(57) ABSTRACT

An object of the present disclosure is to provide a refrigerator configured to improve main body stiffness, which is decreased as thickness of an insulation material is reduced to increase inner capacity of the main body, using a reinforcement structure, resulting in reduction of deformation of the main body.

Another object of the present disclosure is to provide a refrigerator in which an electronic box including various electronic constituent elements needed to control the operation of the refrigerator is disposed in a hinge cover provided in a forward direction of an upper part of the main body, resulting in improved space utilization (or space occupancy).

Another object of the present disclosure is to provide a refrigerator in which a reinforcement plate formed of steel is contained in the electronic box, such that, although a fire breaks out in constituent elements contained in the elec- (Continued)

tronic box, the refrigerator can prevent the fire from spreading to the outside of the electronic box using the steel reinforcement plate.

20 Claims, 43 Drawing Sheets

(51) Int. Cl.
*F25D 17/06* (2006.01)
*F25D 23/02* (2006.01)
*F25D 23/06* (2006.01)
*F25D 25/02* (2006.01)

(52) U.S. Cl.
CPC ..... *F25D 23/028* (2013.01); *F25D 23/062* (2013.01); *F25D 25/025* (2013.01); *F25D 2201/126* (2013.01); *F25D 2323/021* (2013.01); *F25D 2323/024* (2013.01)

(58) Field of Classification Search
CPC ..... F25D 2323/021; F25D 2323/024; F25D 11/022; F25D 23/028; F25D 25/025; F25D 29/005; F25D 2201/126
See application file for complete search history.

(56) References Cited

U.S. PATENT DOCUMENTS

| | | | | |
|---|---|---|---|---|
| 3,027,732 | A | 4/1962 | Mann et al. | |
| 3,793,847 | A * | 2/1974 | Scarlett | F25D 17/065 62/190 |
| 3,893,307 | A * | 7/1975 | Jacobs | F25D 21/14 62/150 |
| 5,799,500 | A * | 9/1998 | Kang | F25D 17/045 62/407 |
| 6,347,530 | B1 | 2/2002 | Kim | |
| 7,107,785 | B2 | 9/2006 | Bärmann et al. | |
| 8,926,034 | B2 | 1/2015 | Park | |
| 2005/0126206 | A1 | 6/2005 | Oh | |
| 2006/0070395 | A1* | 4/2006 | Lee | F25D 17/045 62/408 |
| 2006/0096312 | A1* | 5/2006 | Shim | F25D 17/065 62/419 |
| 2006/0248915 | A1* | 11/2006 | Lee | F25D 11/022 62/407 |
| 2007/0044498 | A1* | 3/2007 | Kang | F25D 11/022 62/276 |
| 2010/0125365 | A1* | 5/2010 | Ahn | F25D 29/00 700/275 |
| 2011/0011118 | A1* | 1/2011 | Cho | F25D 17/067 62/515 |
| 2011/0252817 | A1* | 10/2011 | Tunzi | F25D 17/065 62/89 |
| 2012/0096887 | A1* | 4/2012 | Cho | F25D 21/08 62/276 |
| 2013/0106274 | A1 | 5/2013 | Yang | |
| 2020/0386468 | A1* | 12/2020 | Matsuno | F25D 17/045 |

FOREIGN PATENT DOCUMENTS

| | | | |
|---|---|---|---|
| CN | 1169184 | A | 12/1997 |
| CN | 1769823 | A | 5/2006 |
| CN | 2828688 | Y | 10/2006 |
| CN | 1920452 | A | 2/2007 |
| CN | 102032744 | A | 4/2011 |
| CN | 202485306 | U | 10/2012 |
| CN | 202573314 | U | 12/2012 |
| CN | 202835993 | U | 3/2013 |
| CN | 103033015 | | 4/2013 |
| CN | 202853233 | U | 4/2013 |
| CN | 203454520 | U | 2/2014 |
| DE | 11 2005 002 832 | T5 | 1/2008 |
| EP | 1904797 | | 7/2012 |
| EP | 3 093 589 | A1 | 11/2016 |
| EP | 3 657 106 | A1 | 5/2020 |
| EP | 3 657 106 | B1 | 8/2022 |
| GB | 2 012 937 | A | 8/1979 |
| JP | 4-98072 | A | 3/1992 |
| JP | 8-152254 | | 6/1996 |
| JP | 8-296953 | | 11/1996 |
| JP | 10-103844 | | 4/1998 |
| JP | 2000-346531 | | 12/2000 |
| JP | 2002-90028 | | 3/2002 |
| JP | 2002090028 | A * | 3/2002 |
| JP | 2003-21448 | | 1/2003 |
| JP | 2005-90924 | | 4/2005 |
| JP | 2007-225193 | | 9/2007 |
| JP | 2008-75890 | | 4/2008 |
| JP | 2011-64340 | | 3/2011 |
| JP | 2013-195030 | | 9/2013 |
| KR | 10-2007-0043446 | | 4/2007 |
| KR | 10-0800195 | | 2/2008 |
| KR | 10-2010-0004810 | | 1/2010 |
| KR | 10-2013-0057618 | | 6/2013 |
| KR | 20120002042 | A * | 6/2013 |
| WO | 101 45 141 | A1 | 4/2003 |
| WO | WO 2006/120058 | A1 | 11/2006 |
| WO | WO 2006/120076 | A2 | 11/2006 |
| WO | WO 2007/006113 | A1 | 1/2007 |
| WO | WO 2010/008141 | A2 | 1/2010 |
| WO | WO 2010/008141 | A3 | 1/2010 |

OTHER PUBLICATIONS

Extended European Search Report dated May 22, 2023 in European Patent Application No. 23160123.8.
"Versilbern" Wikipedia; Anlage 11 D5; Jan. 18, 2023; pp. 1 of 3.
European Office Action dated May 23, 2022 in European Patent Application No. 21 188 526.4.
Chinese Office Action for Chinese Patent Application No. 202011388084.2 dated Dec. 2, 2021.
Chinese Office Action for Chinese Patent Application No. 202011384101.5 dated Nov. 30, 2021.
European Search Report for European Patent Application No. 21188526.4 dated Oct. 19, 2021.
Office Action dated Dec. 12, 2022 in European Patent Application No. 21 188 526.4 (90 pages).
International Search Report mailed Apr. 13, 2015 in corresponding International Application No. PCT/KR2015/000157.
Written Opinion mailed Apr. 13, 2015 in corresponding International Application No. PCT/KR2015/000157.
Office Action issued Feb. 26, 2018, in corresponding Chinese Patent Application No. 201580010475.1, 17 pgs.
Chinese Office Action dated April 9, 2019 in Chinese Patent Application No. 201580010475.1.
Chinese Office Action dated September 1, 2020 in Chinese Patent Application No. 201580010475.1.
US Office Action dated Oct. 13, 2017 in U.S. Appl. No. 15/110,213.
US Office Action dated Mar. 1, 2018 U.S. Appl. No. 15/110,213.
US Office Action dated Jun. 7, 2018 in U.S. Appl. No. 15/110,213.
US Office Action dated Dec. 13, 2018 in U.S. Appl. No. 15/110,213.
US Notice of Allowance dated Mar. 1, 2019 in U.S. Appl. No. 15/110,213.
Brief Communication dated Mar. 12, 2024 including letter from the opponent 01 dated Mar. 4, 2024 in corresponding European application No. 20150463.6.
Brief Communication dated May 13, 2024 including EPO Form 2310, summons to attend oral proceedings pursuant to Rule 115(1) EPC in corresponding European application No. 20150463.6.
European Patent Office Brief Communication for Application 20150463.6 dated Feb. 14, 2025 regarding Letter from the opponent of Feb. 11, 2025.
European Office Action issued Feb. 5, 2025 for European Application No. 23 160 123.8.
Extended European Search Report dated Aug. 11, 2017 in corresponding European Patent Application No. 15735174.3.

(56) References Cited

OTHER PUBLICATIONS

Chinese Office Action dated Sep. 27, 2018 in Chinese Patent Application No. 201580010475.1.
Korean Office Action dated Jan. 15, 2019 in Korean Patent Application No. 10-2014-0089516.

* cited by examiner

[Fig. 1]
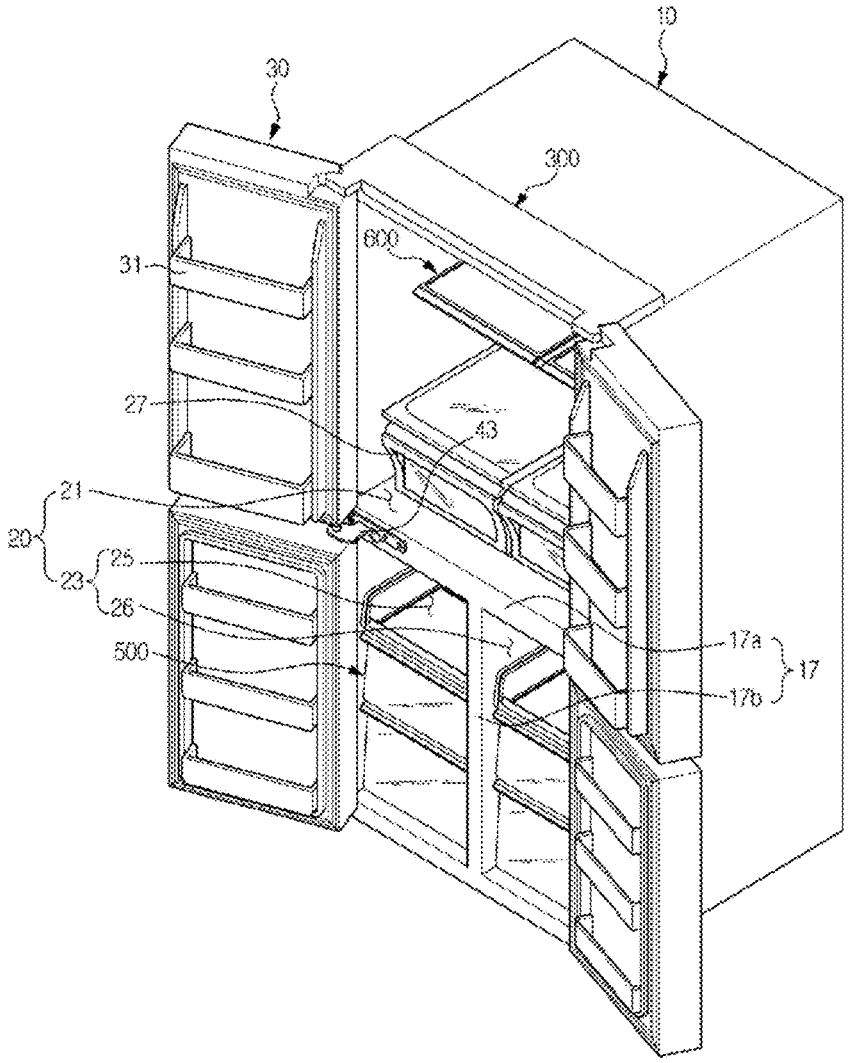

[Fig. 2]
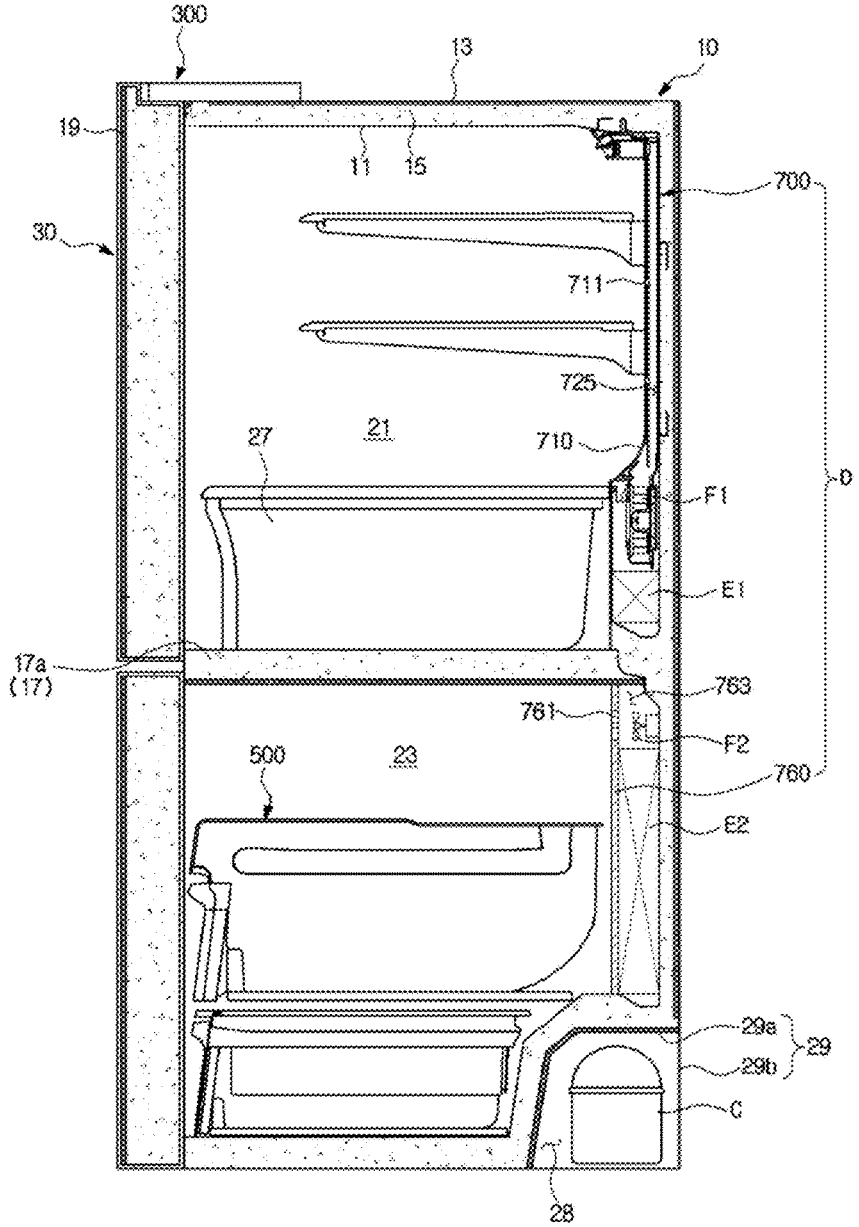

[Fig. 3]
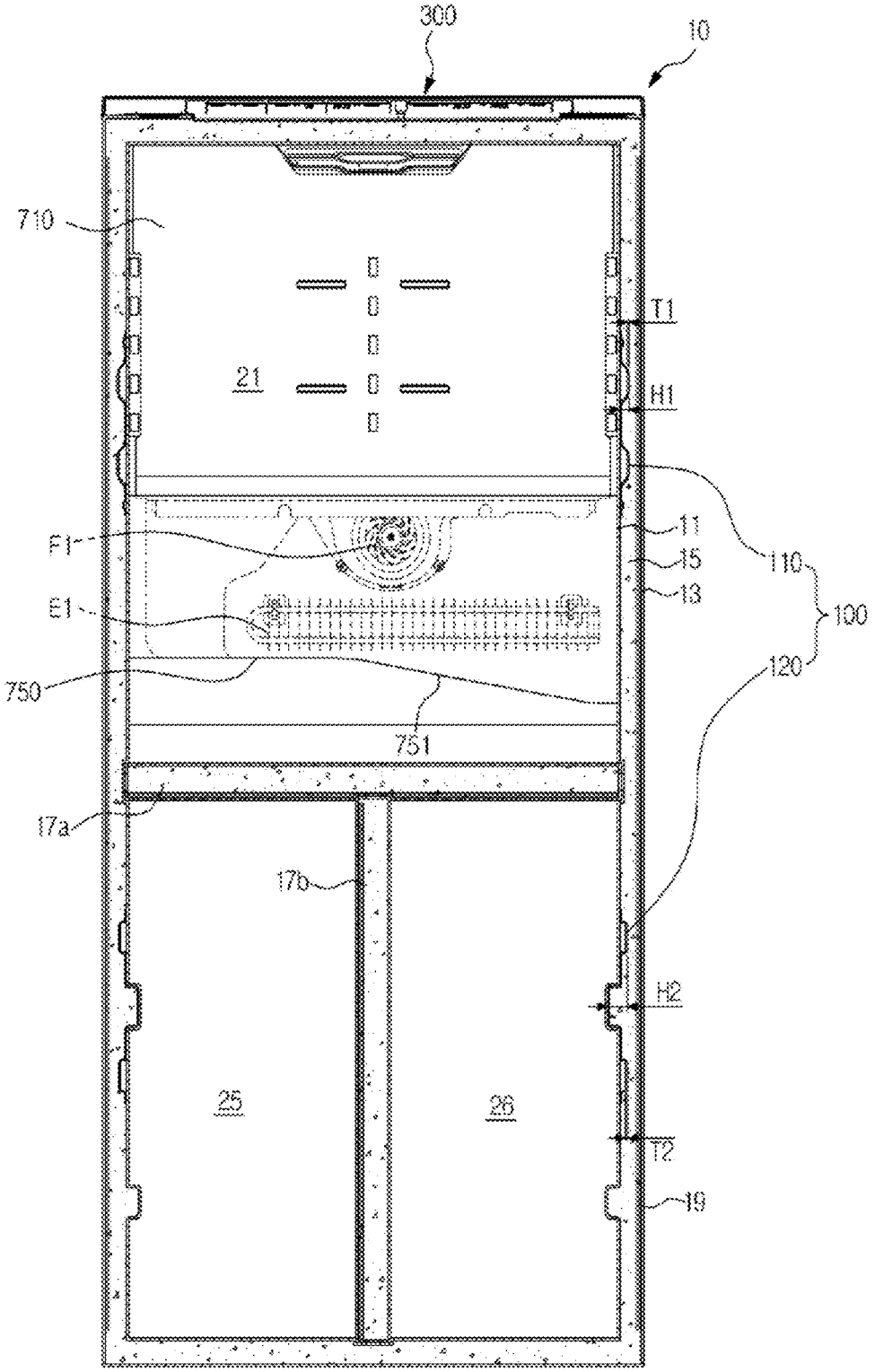

[Fig. 4]
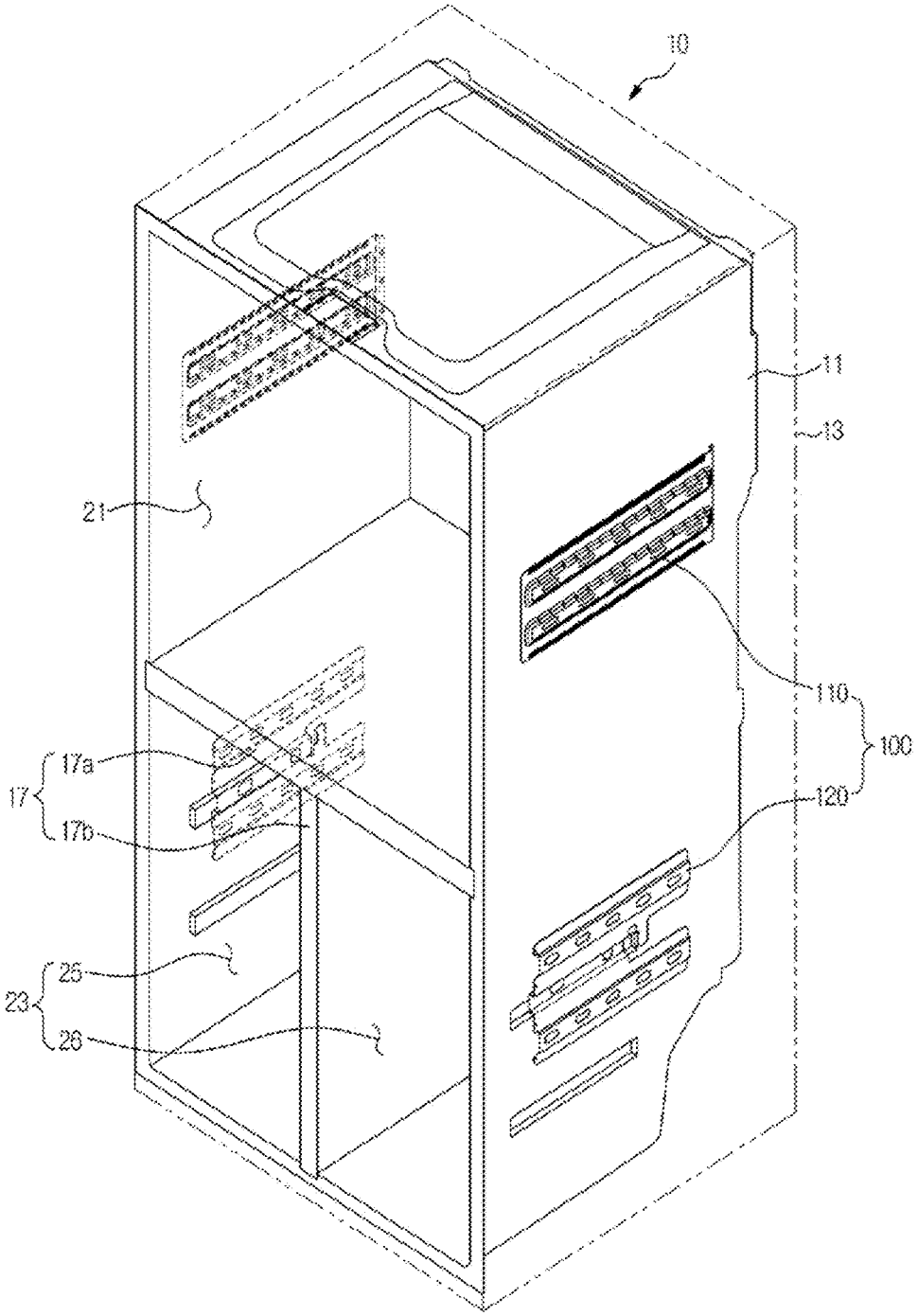

[Fig. 5]
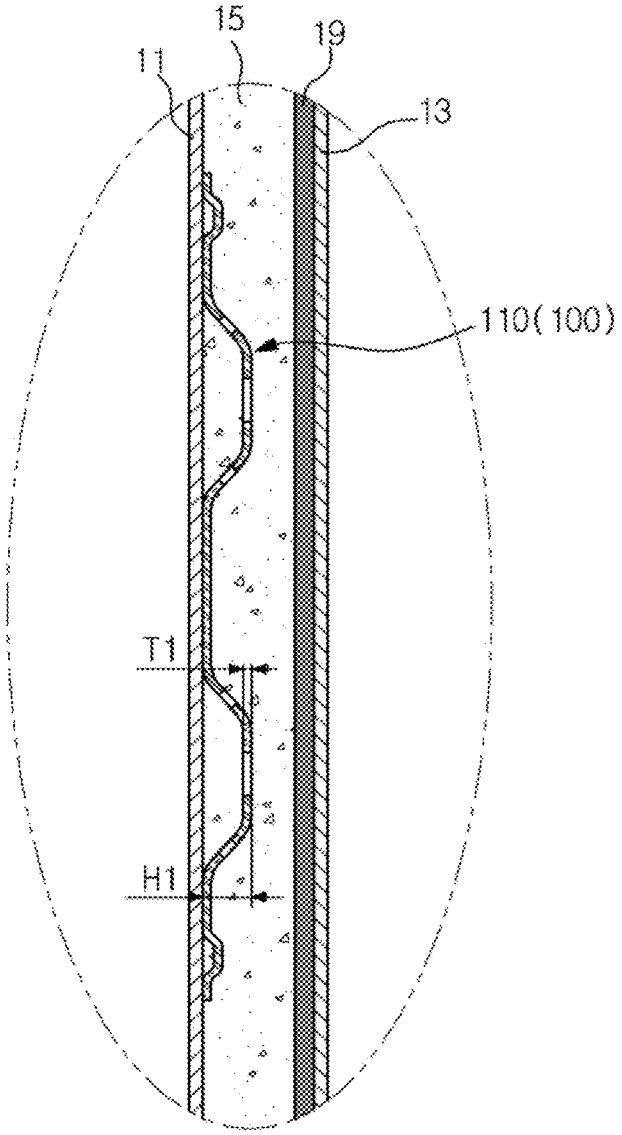

[Fig. 6]
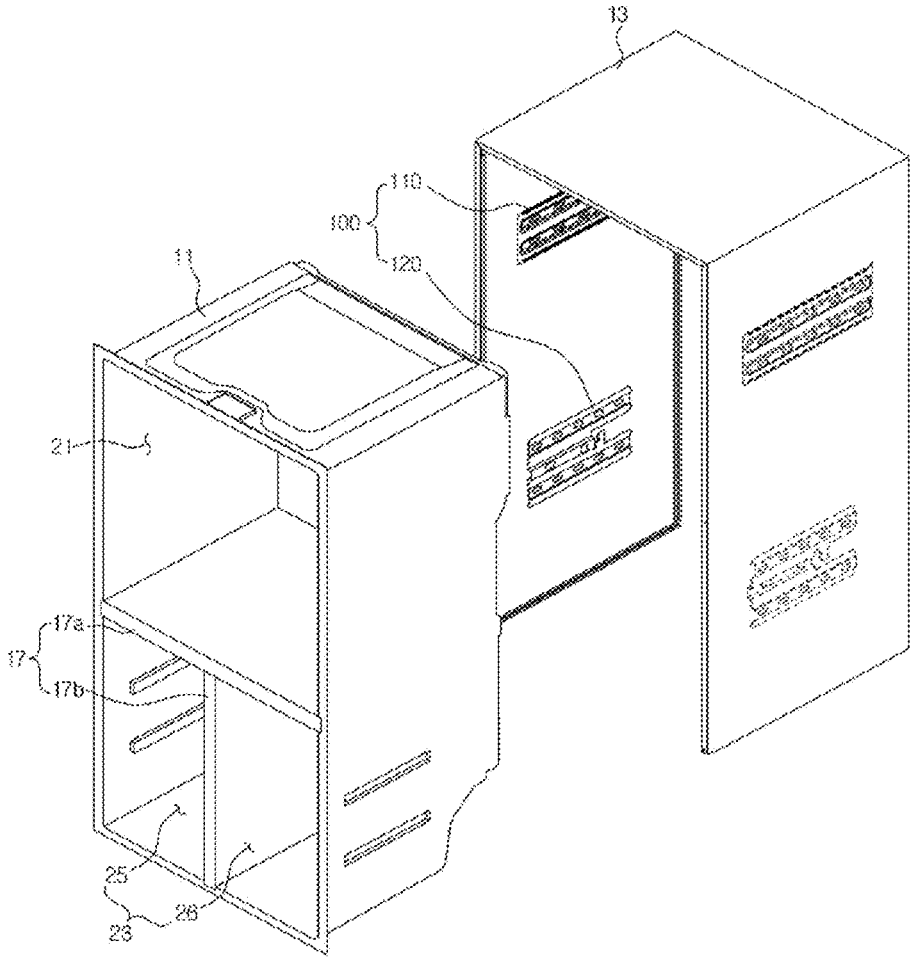

[Fig. 7]
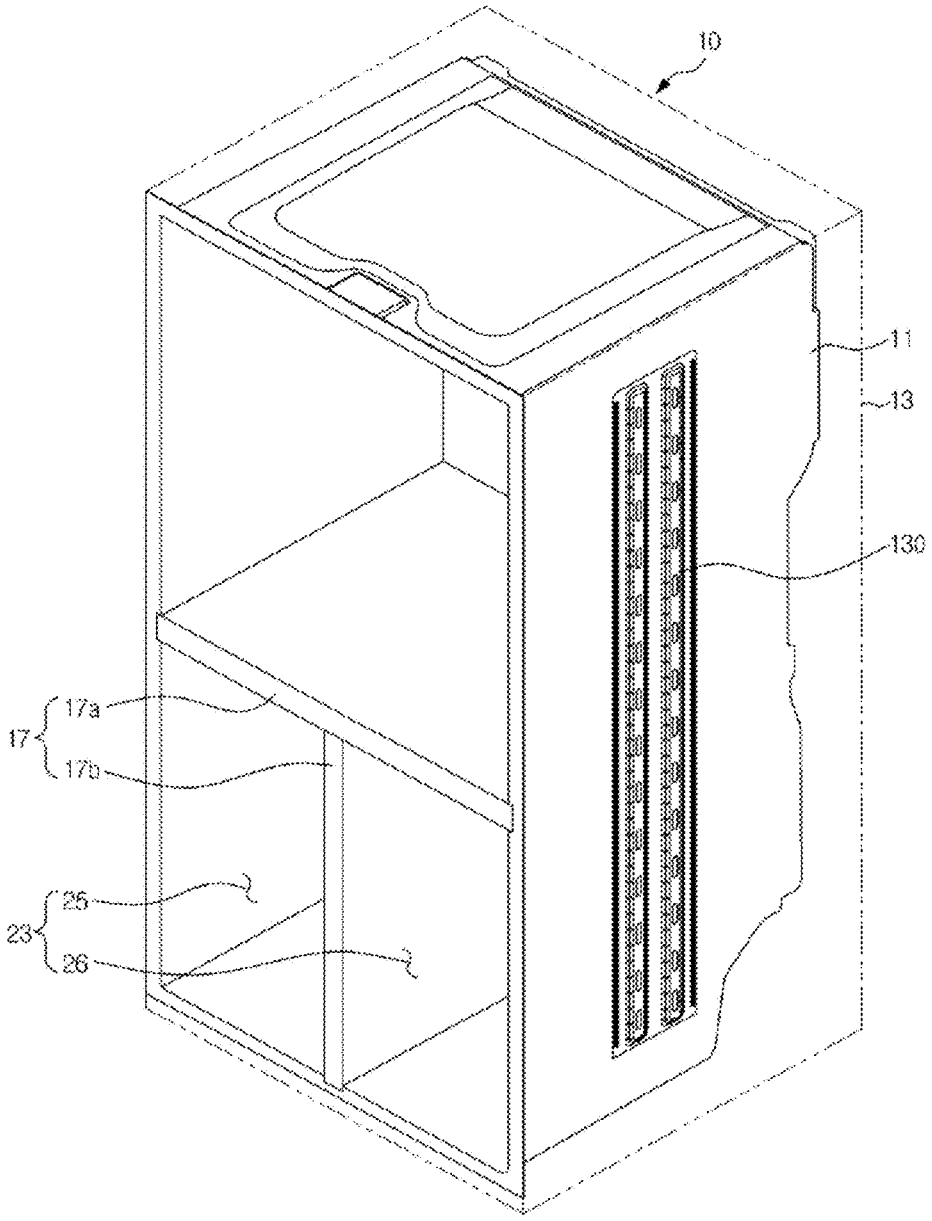

[Fig. 8]
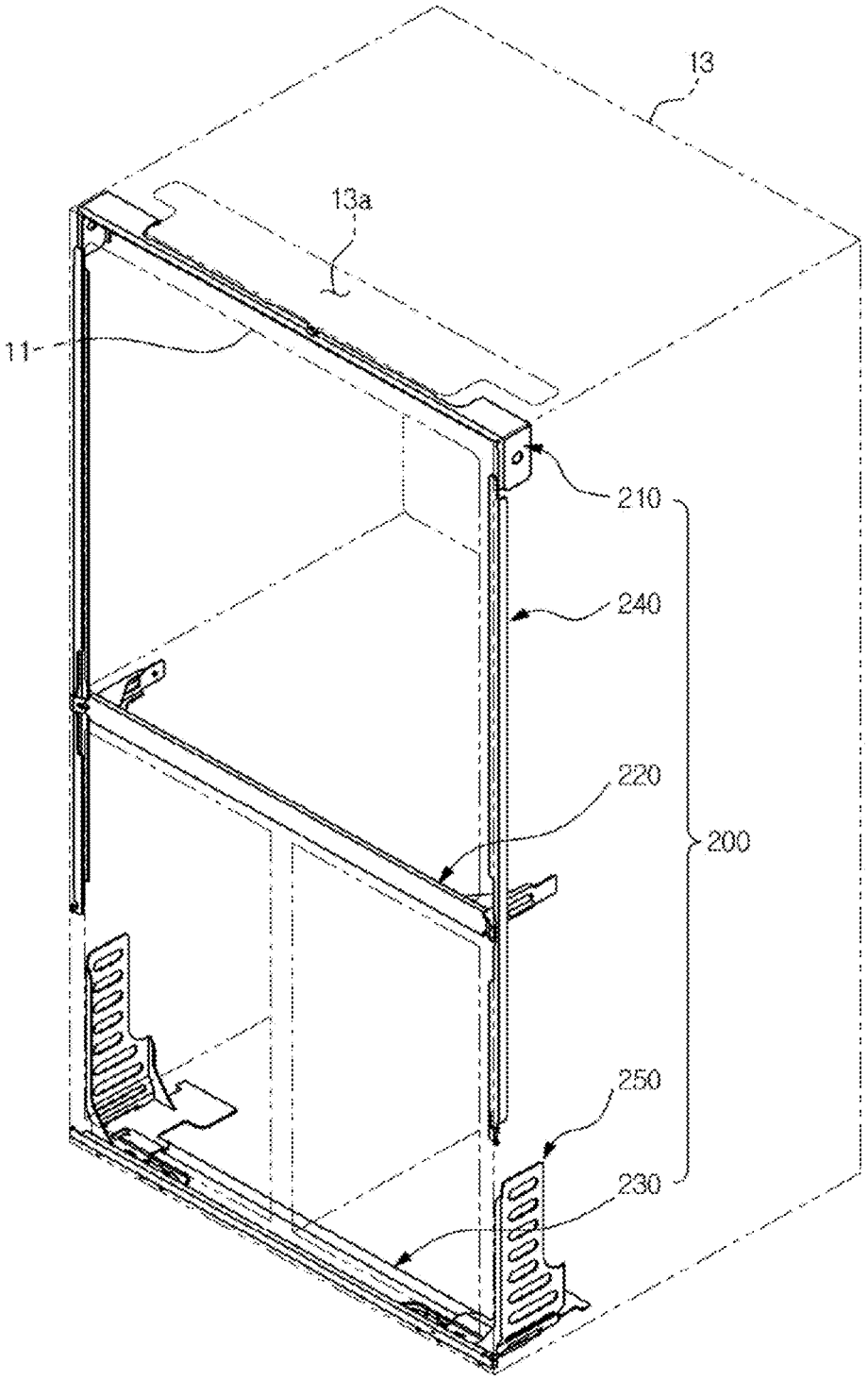

[Fig. 9]
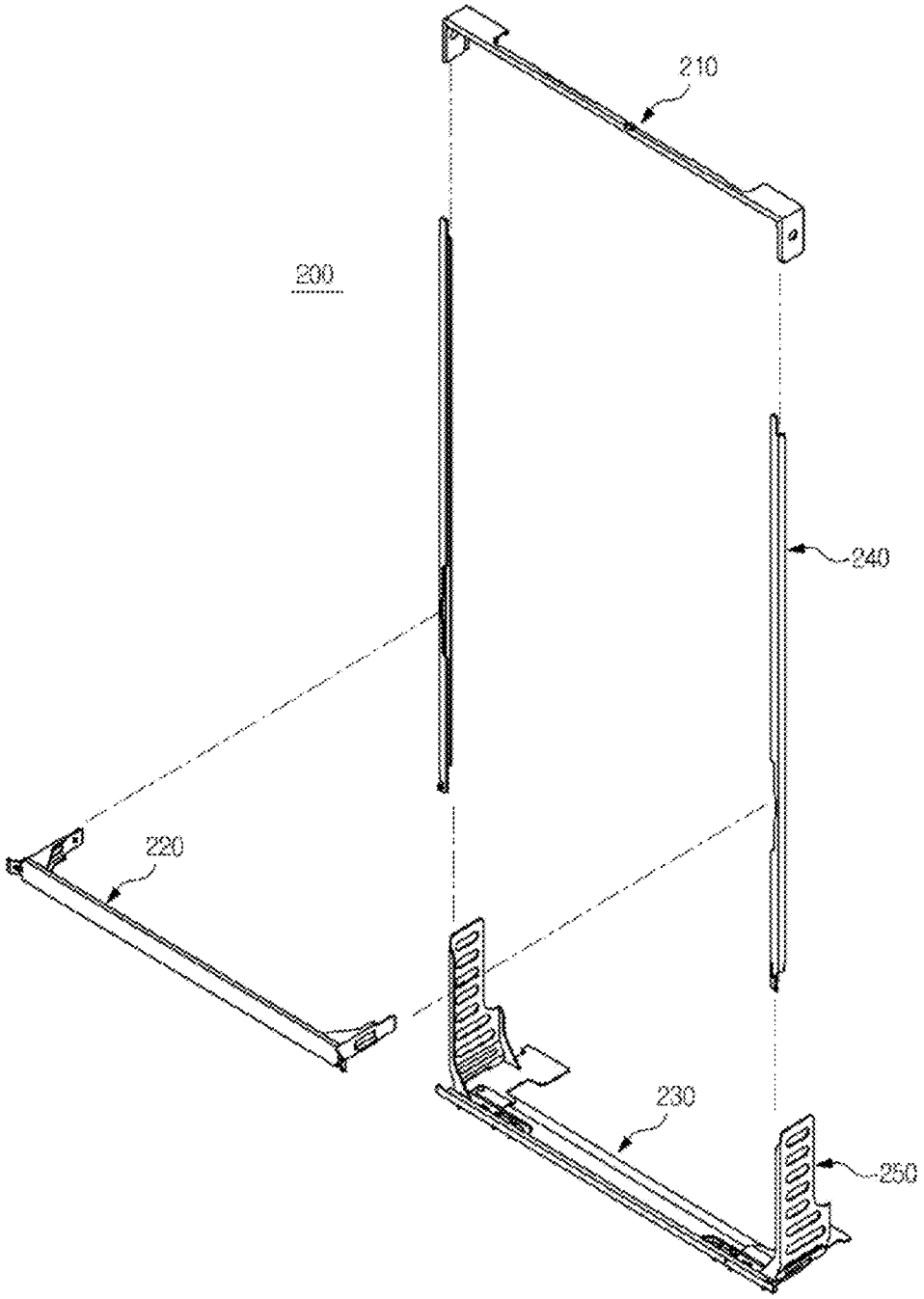

[Fig. 10]
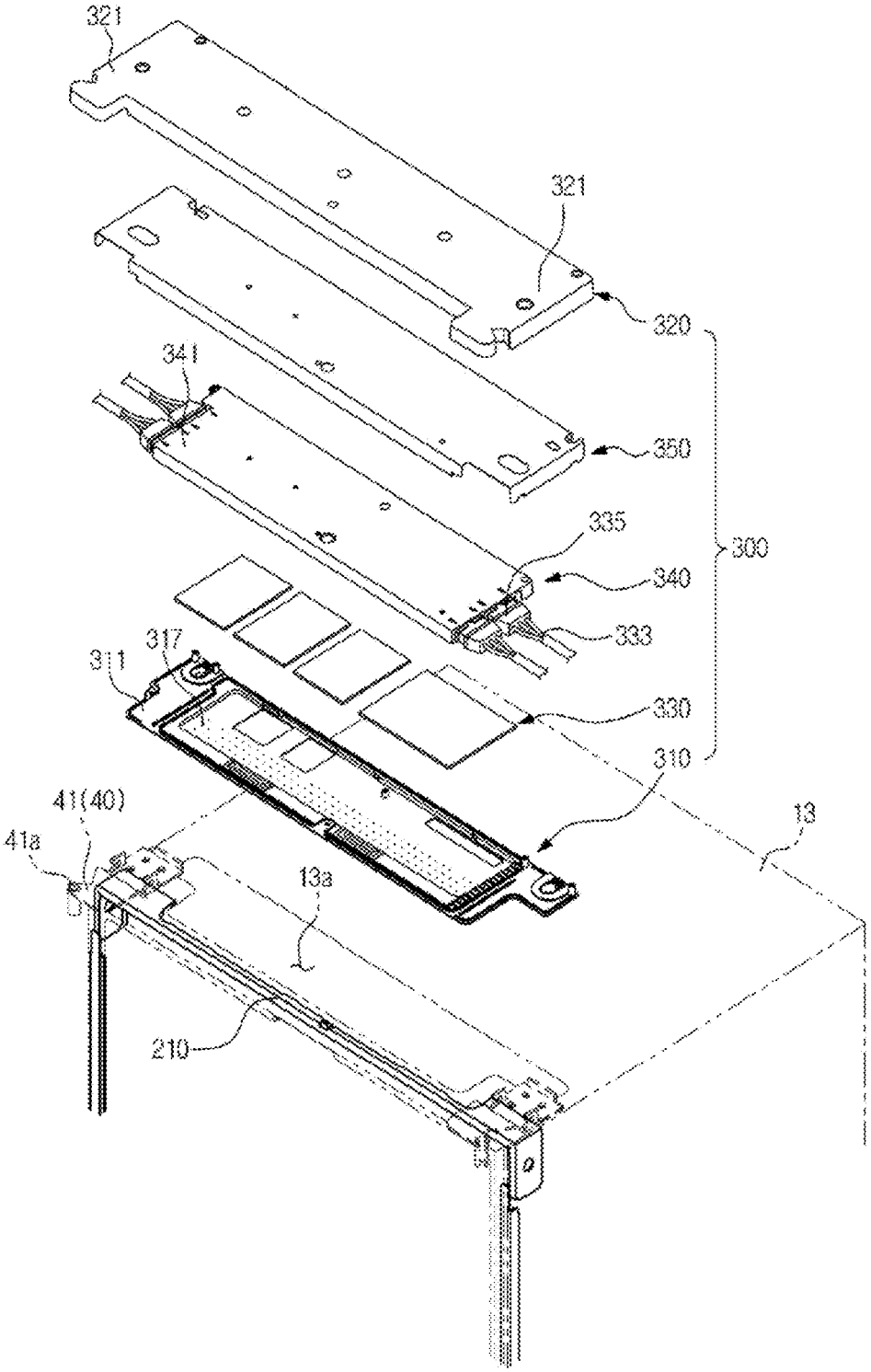

[Fig. 11]
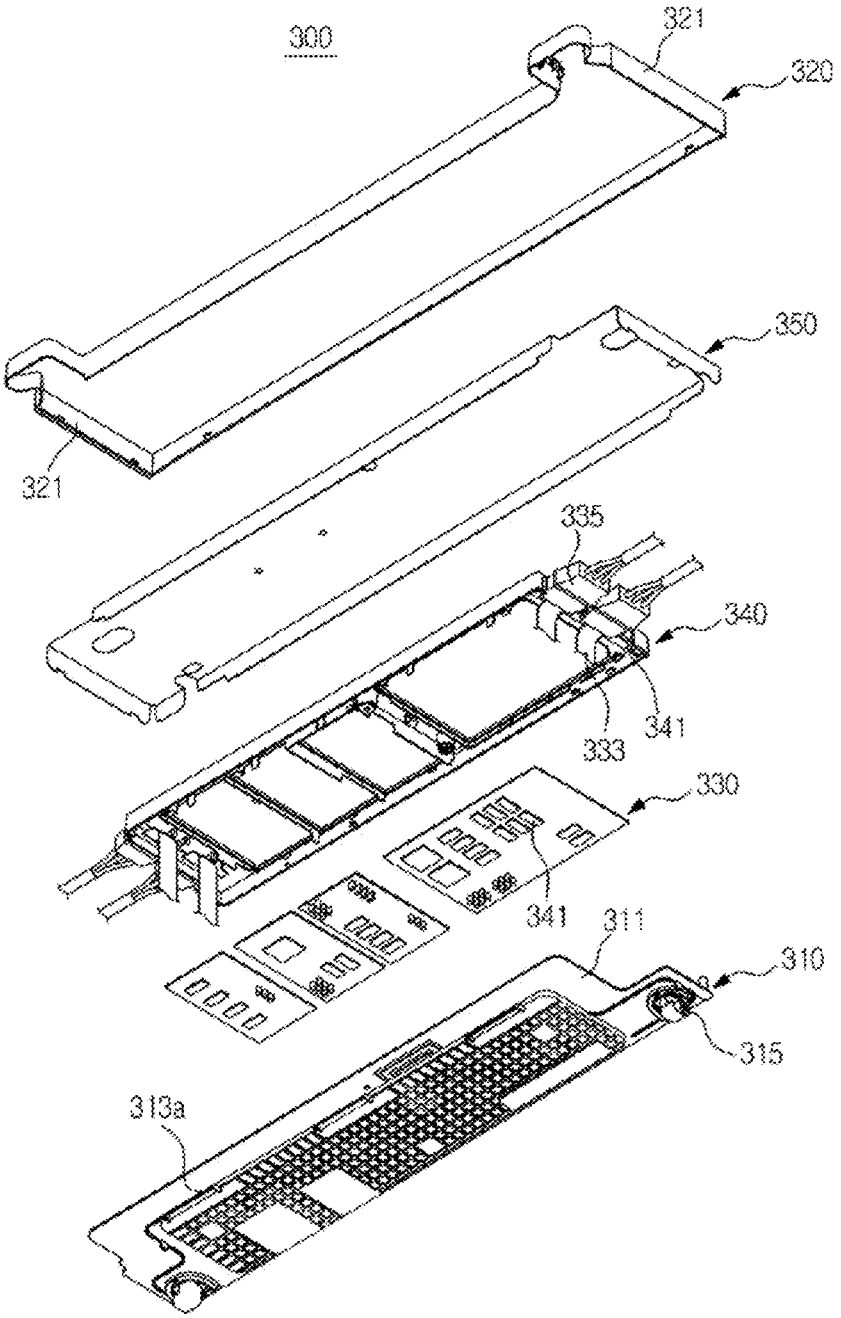

[Fig. 12]
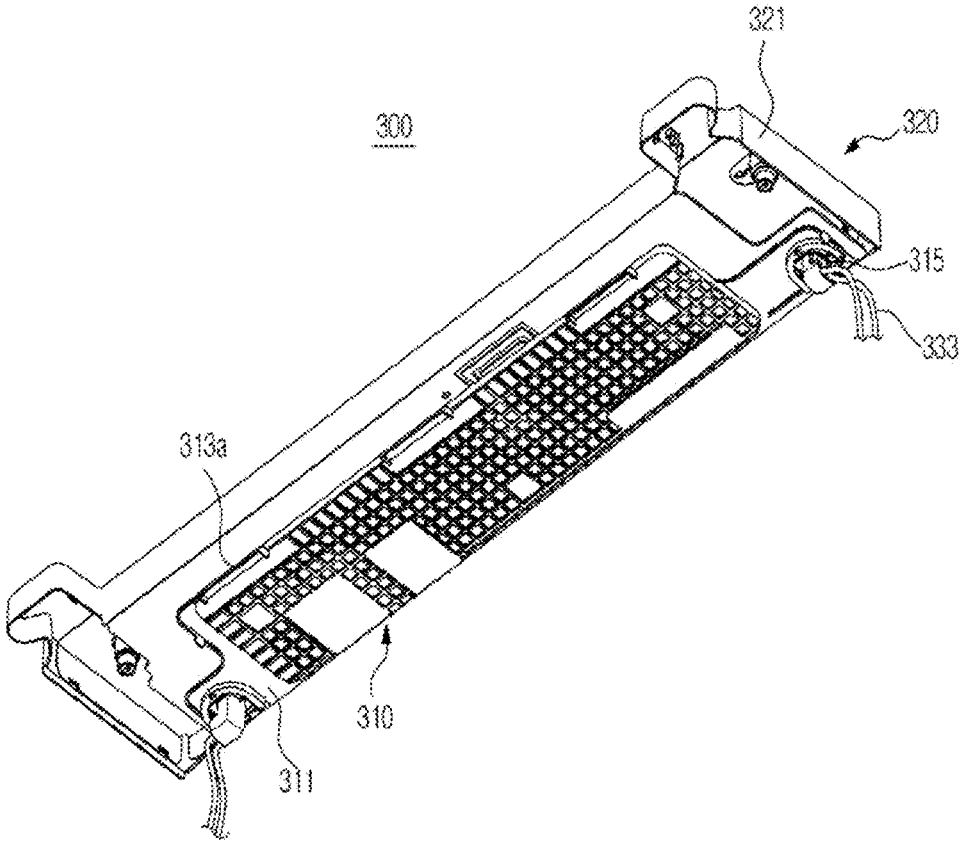

[Fig. 13]
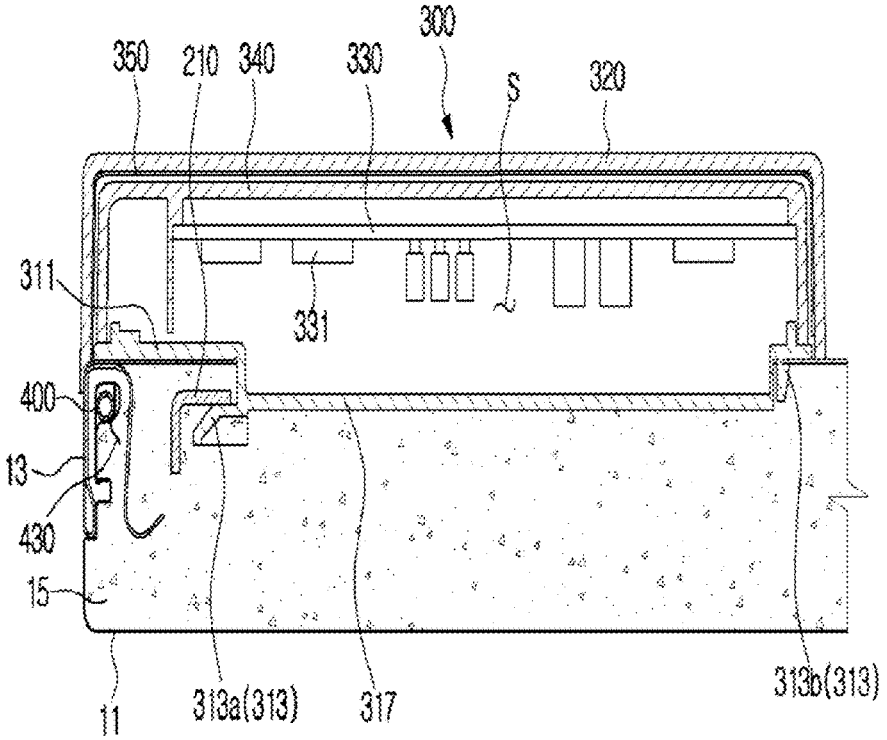
[Fig. 14]
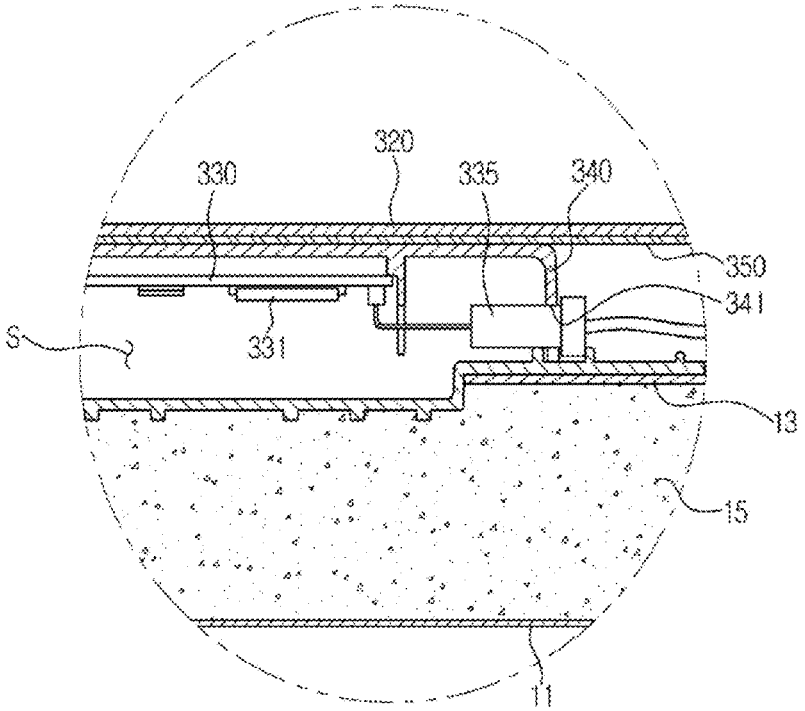

[Fig. 15]
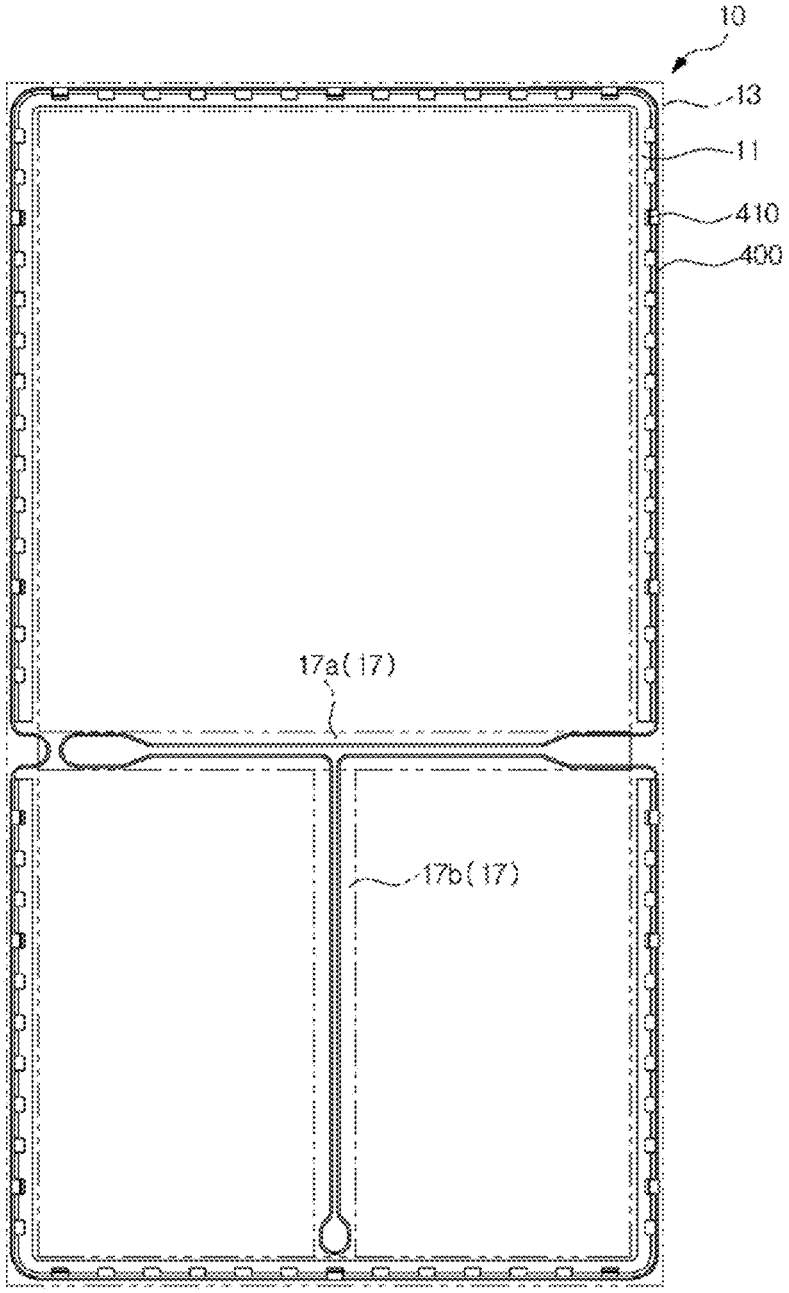

[Fig. 16]
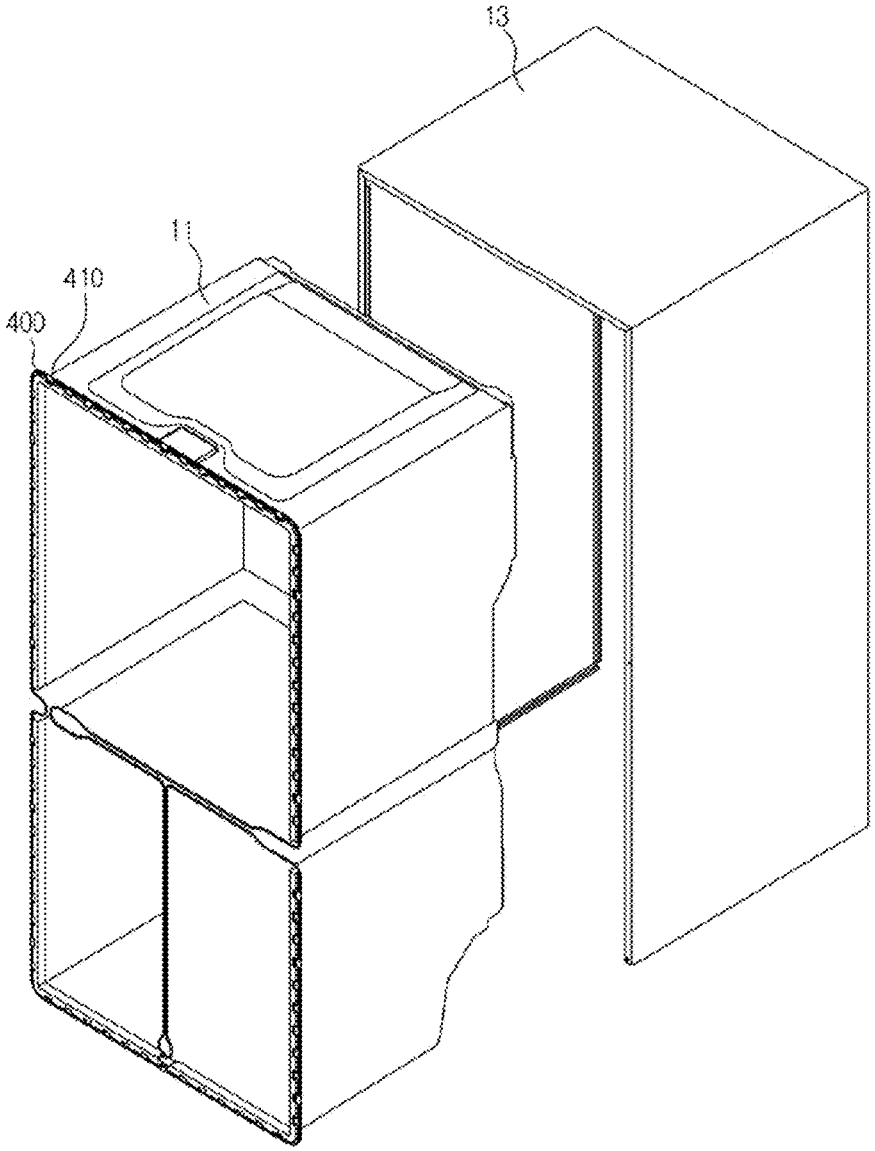

[Fig. 17]
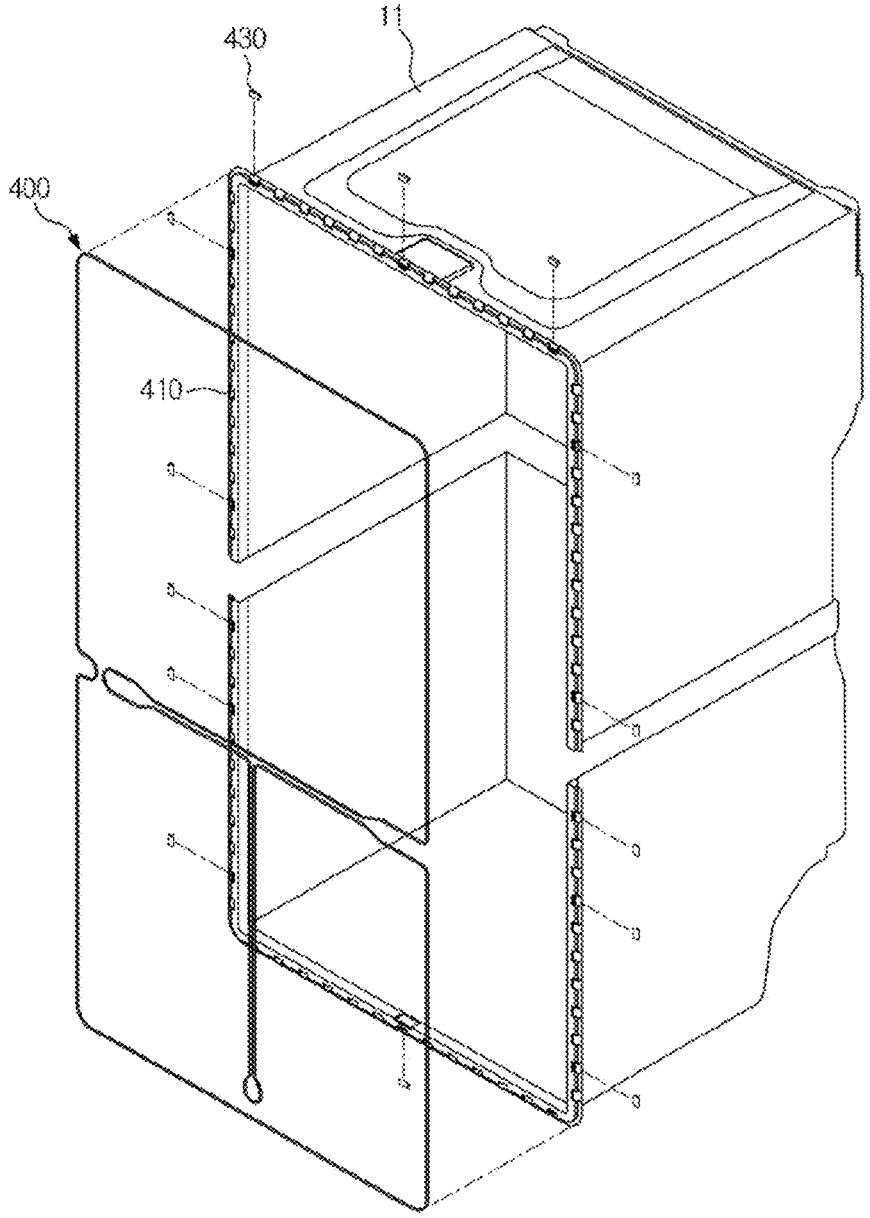

[Fig. 18]
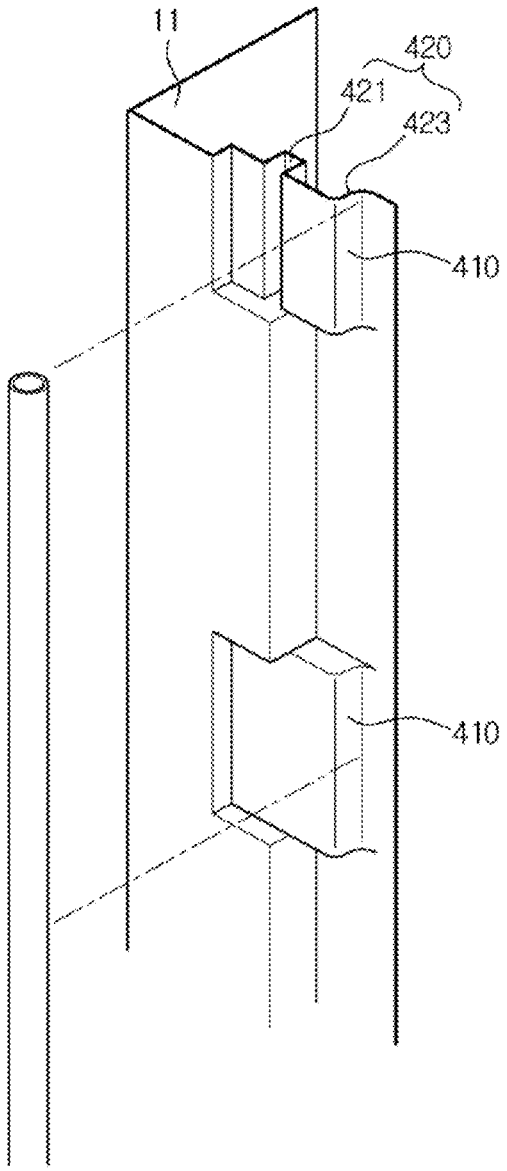

[Fig. 19]
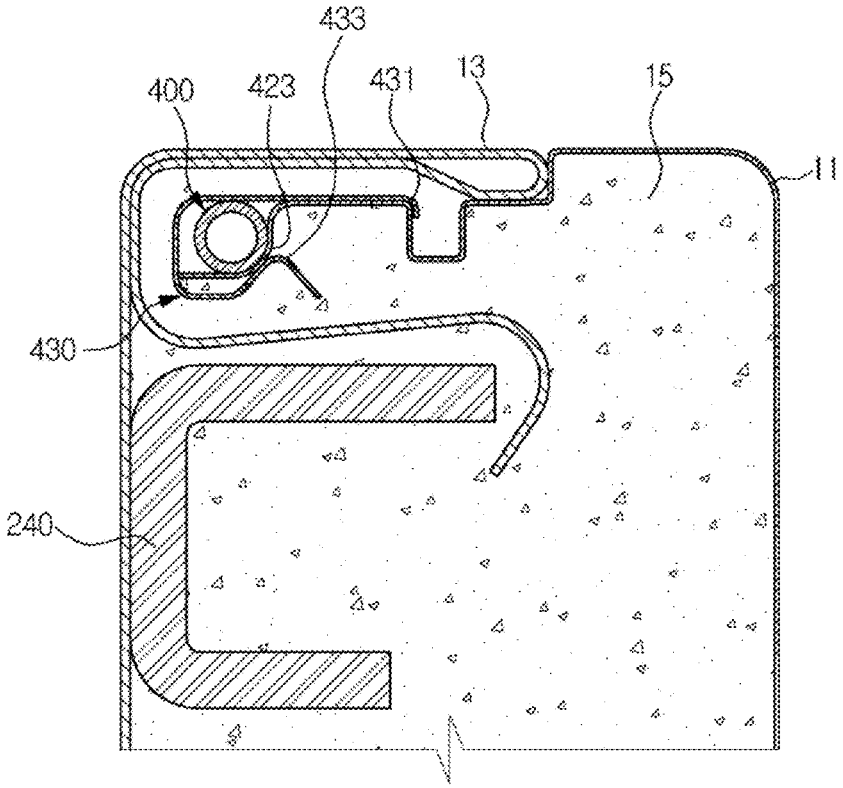

[Fig. 20]
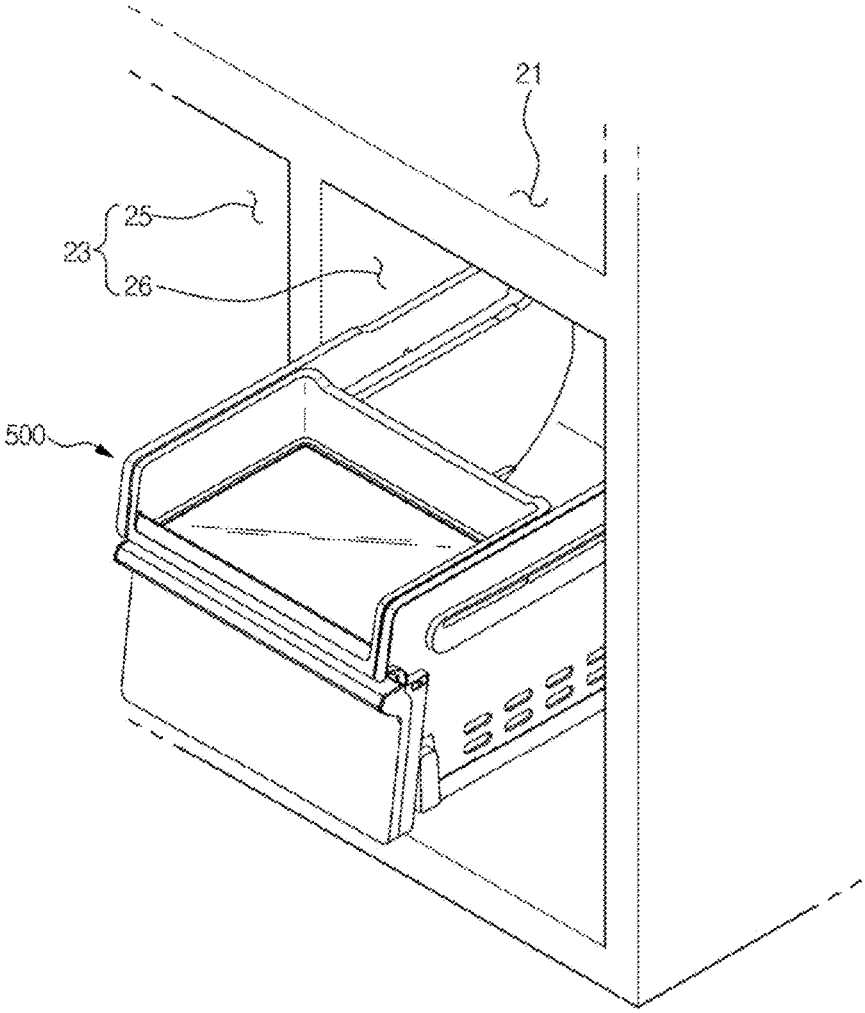

[Fig. 21]
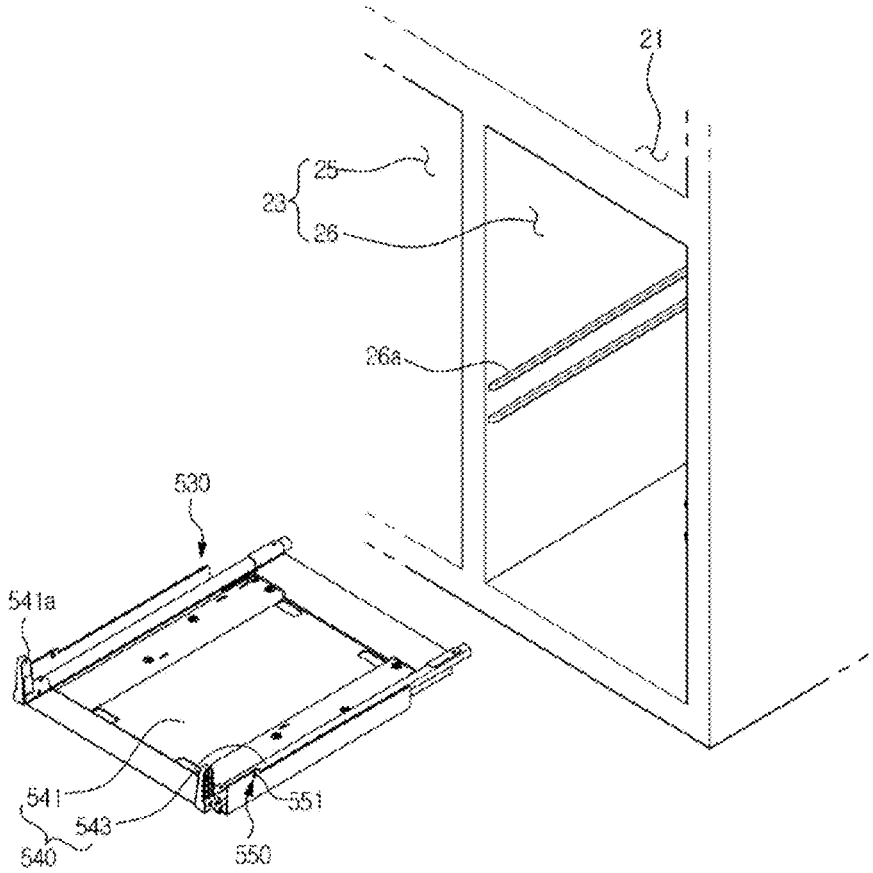

[Fig. 22]
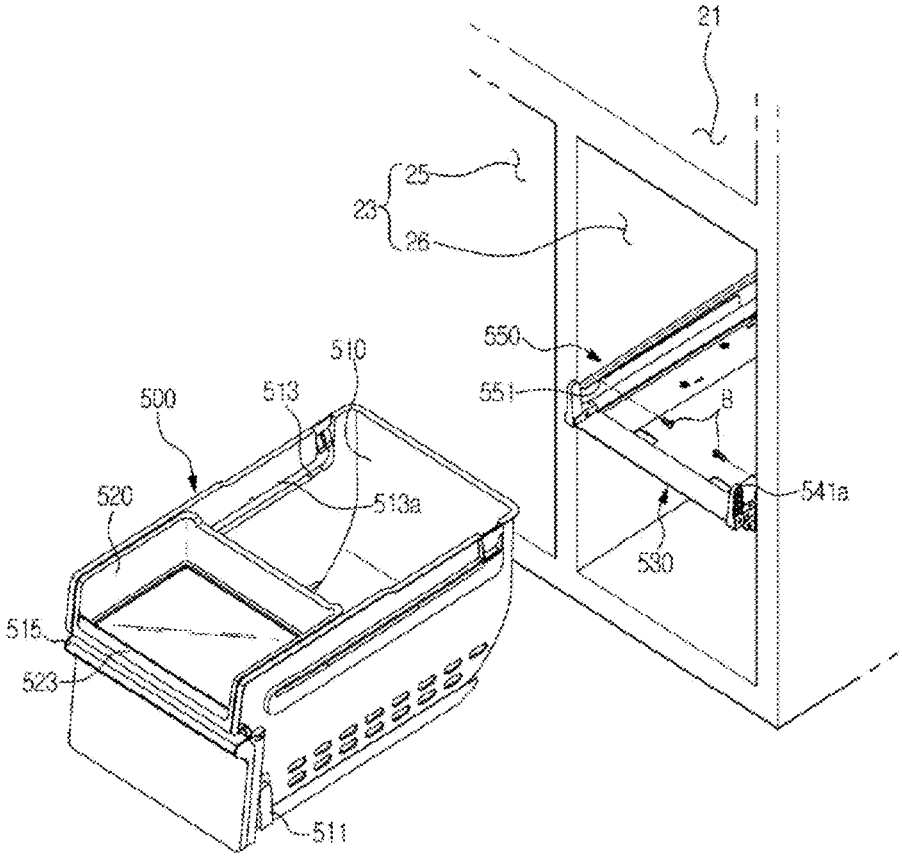

[Fig. 23]
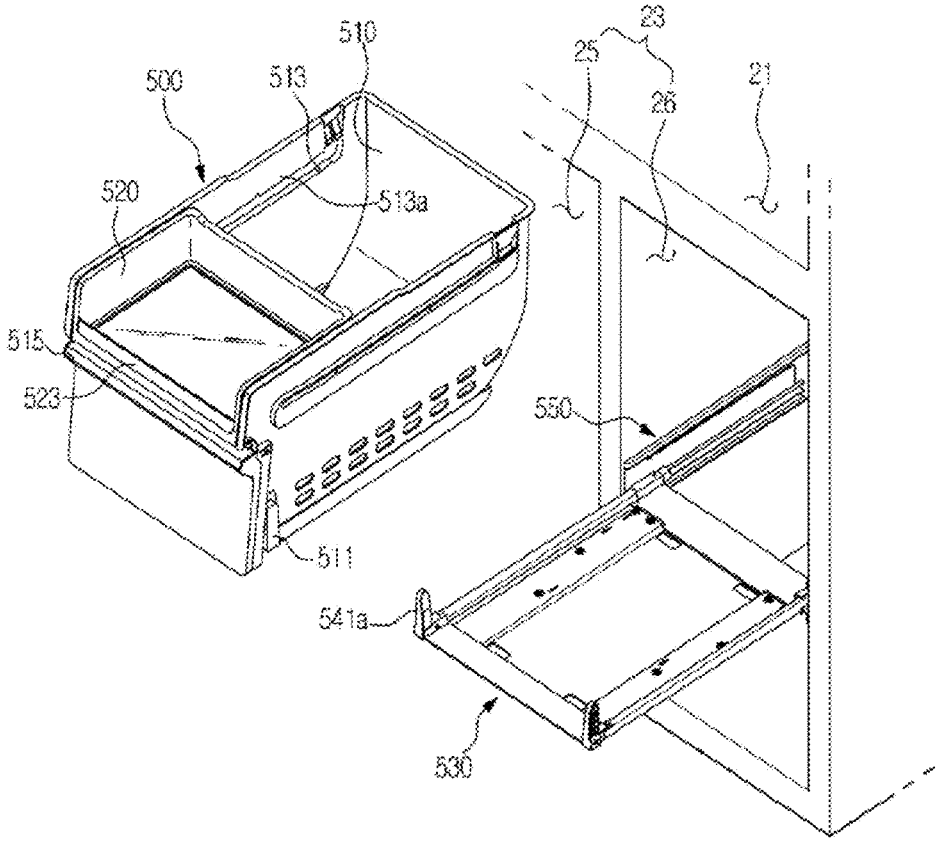

[Fig. 24]
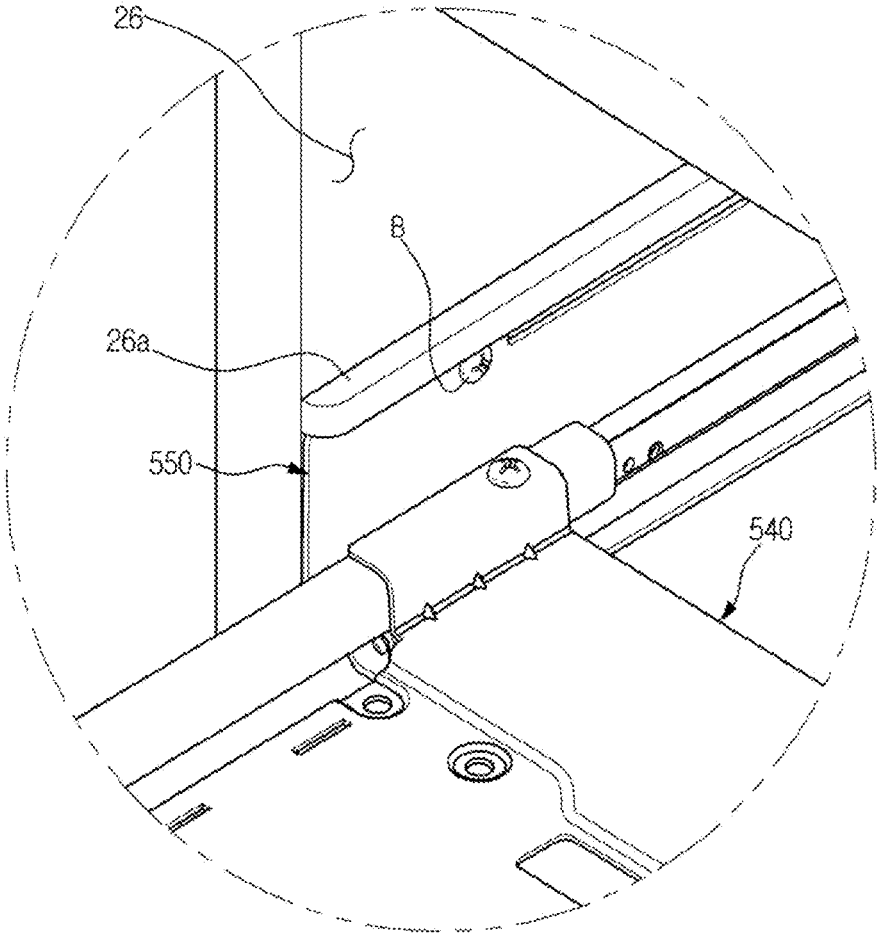

[Fig. 25]
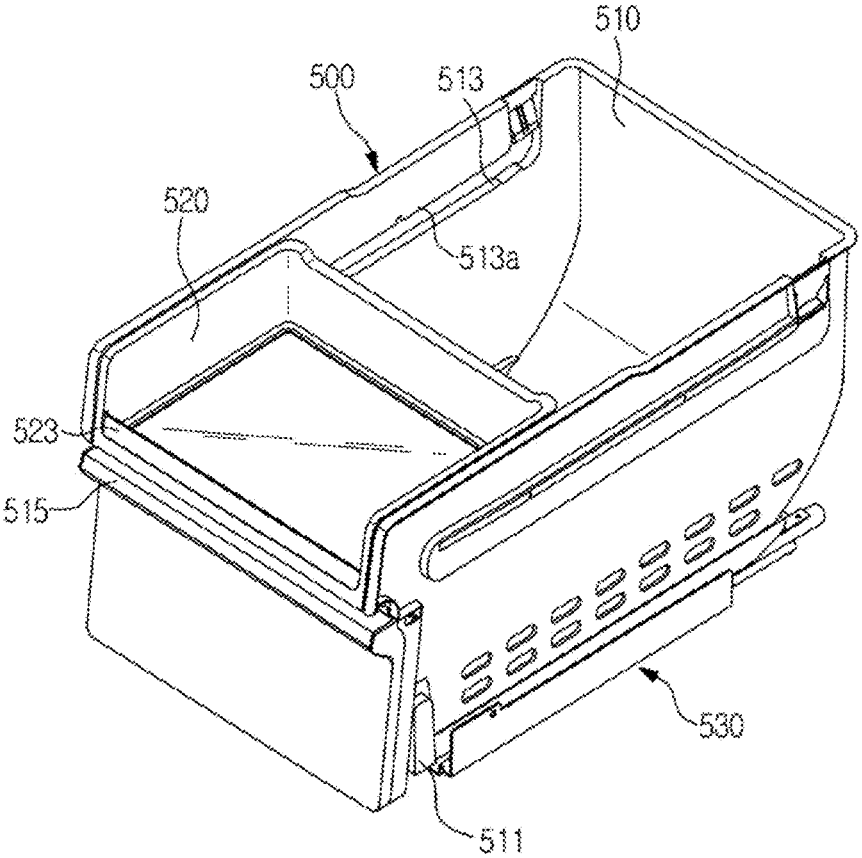

[Fig. 26]
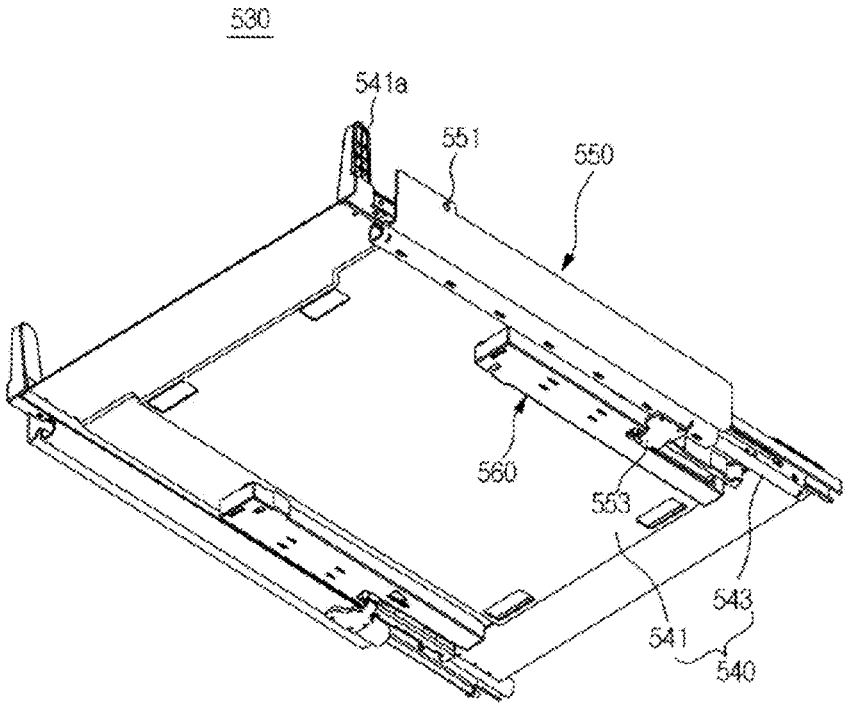
[Fig. 27]
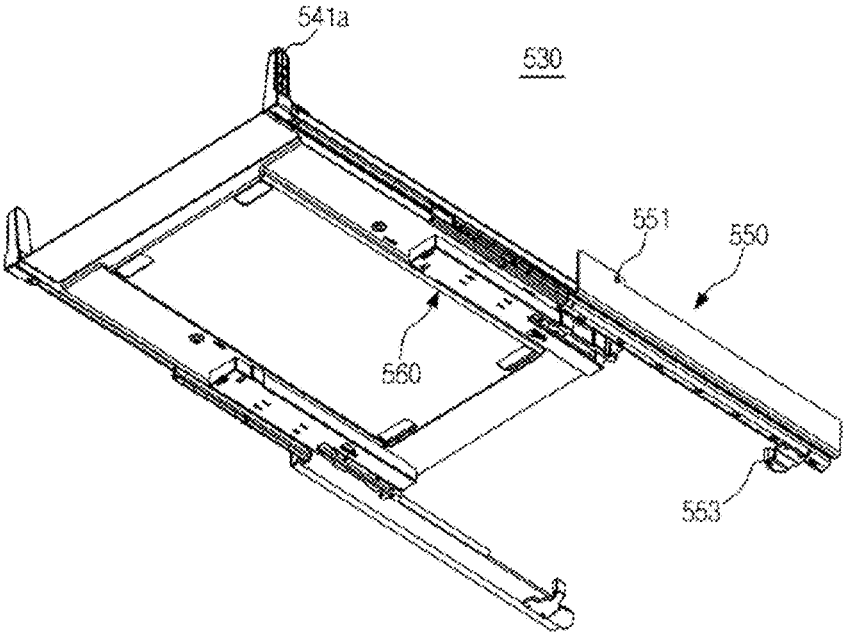

[Fig. 28]
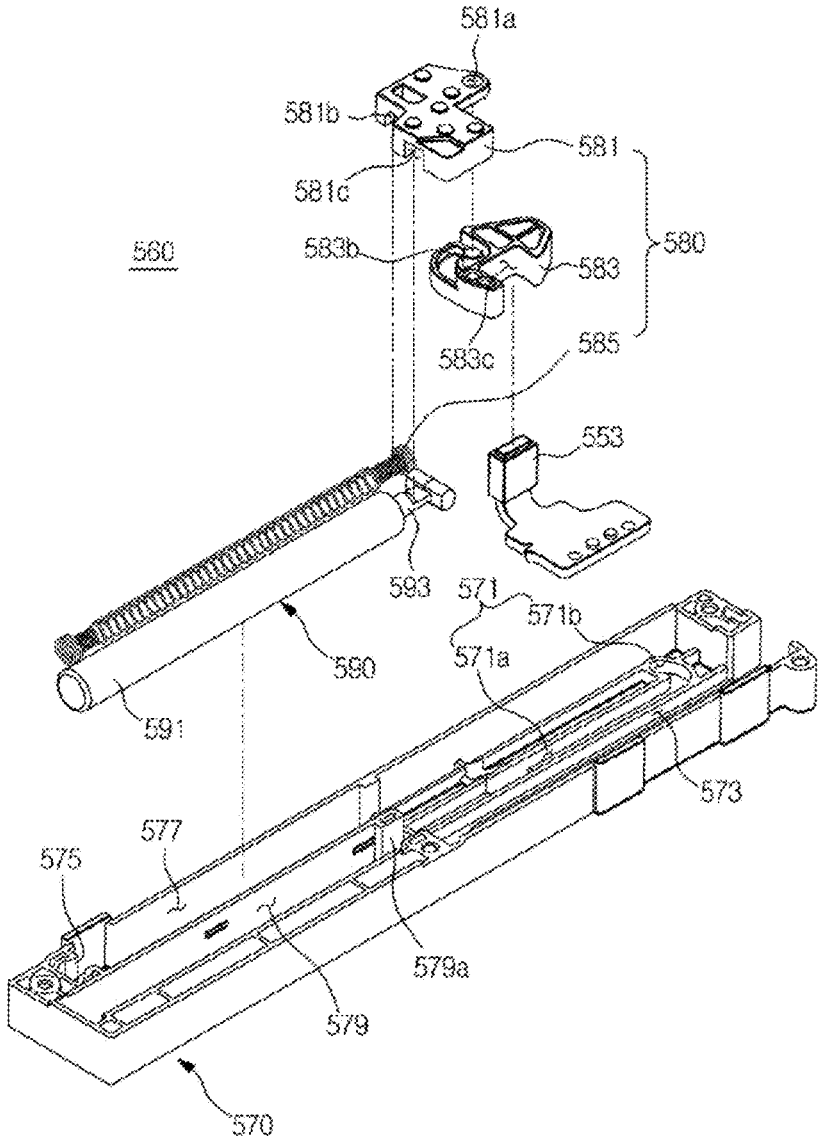

[Fig. 29]
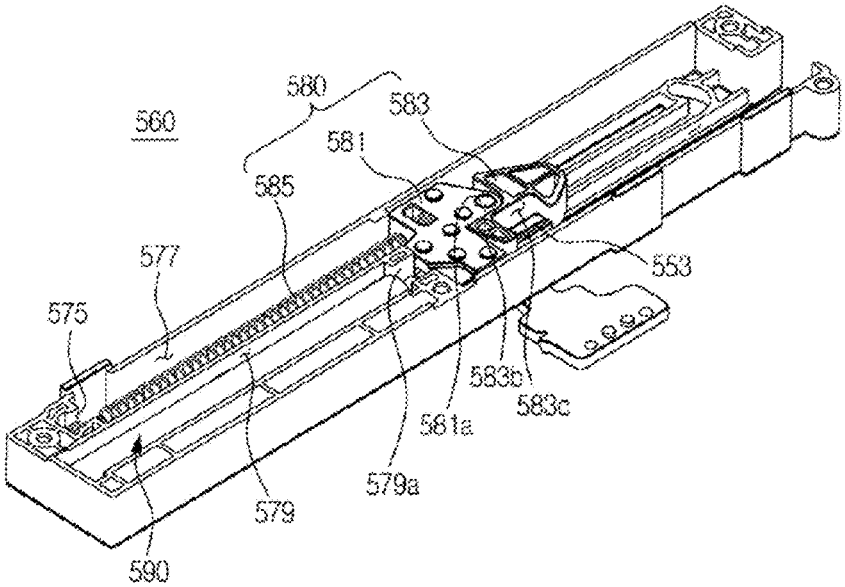
[Fig. 30]
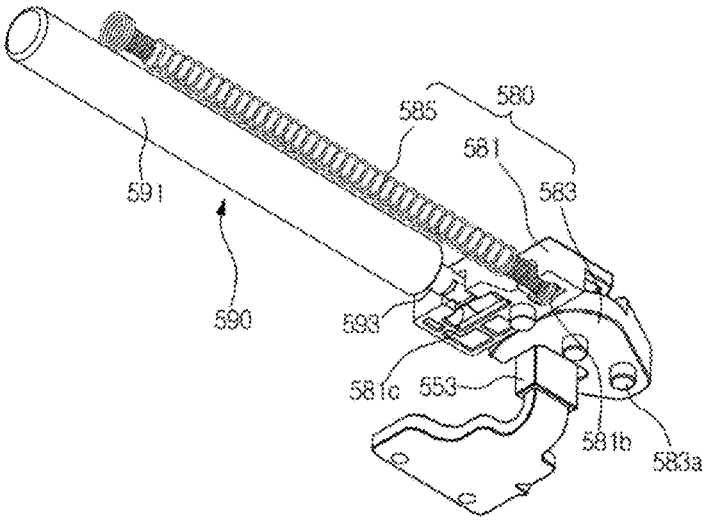

[Fig. 31]
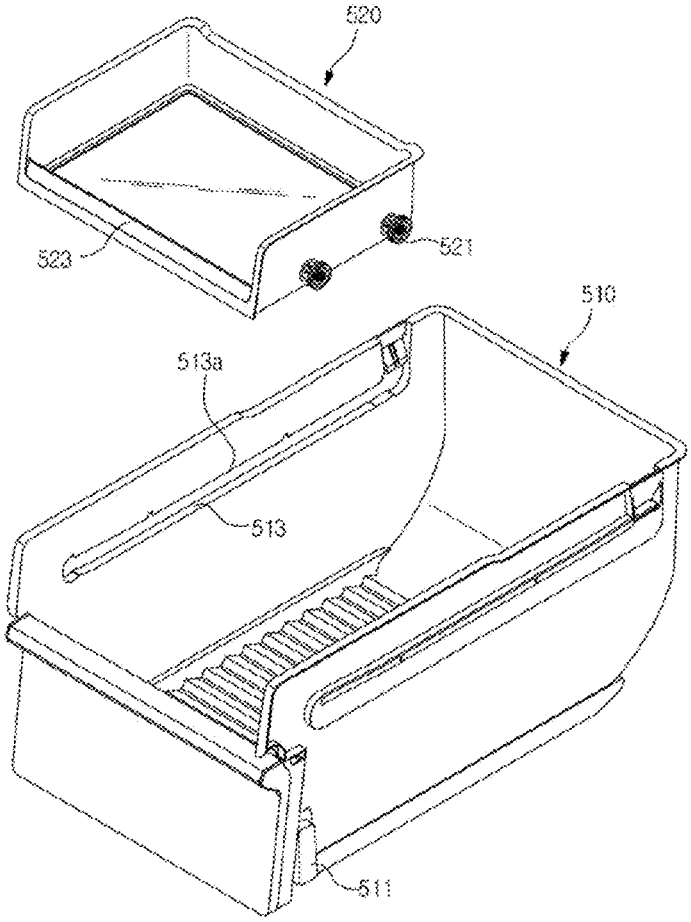
[Fig. 32]
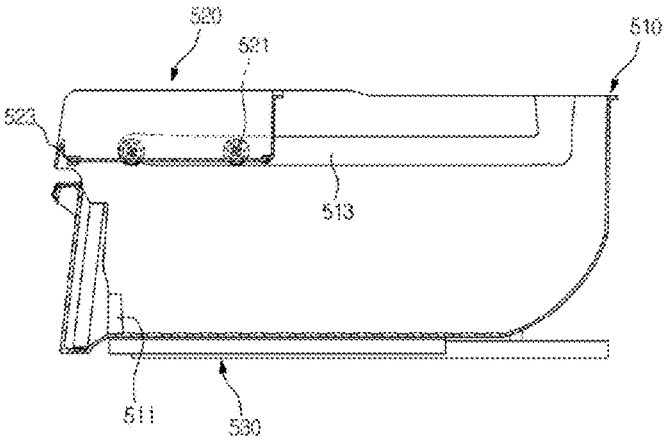

[Fig. 33]
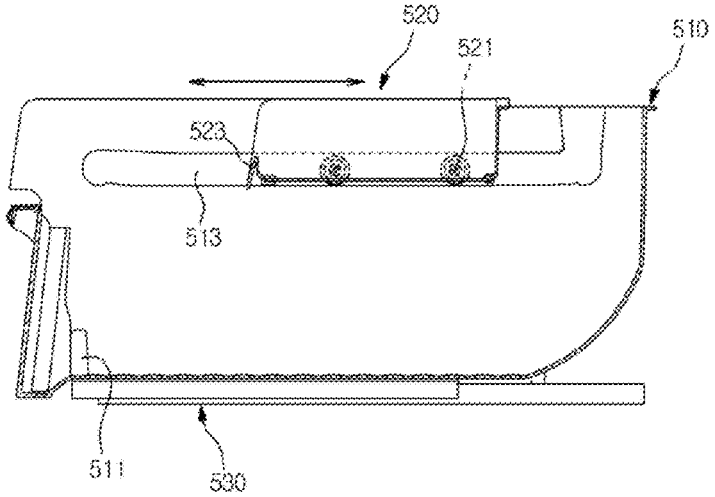
[Fig. 34]
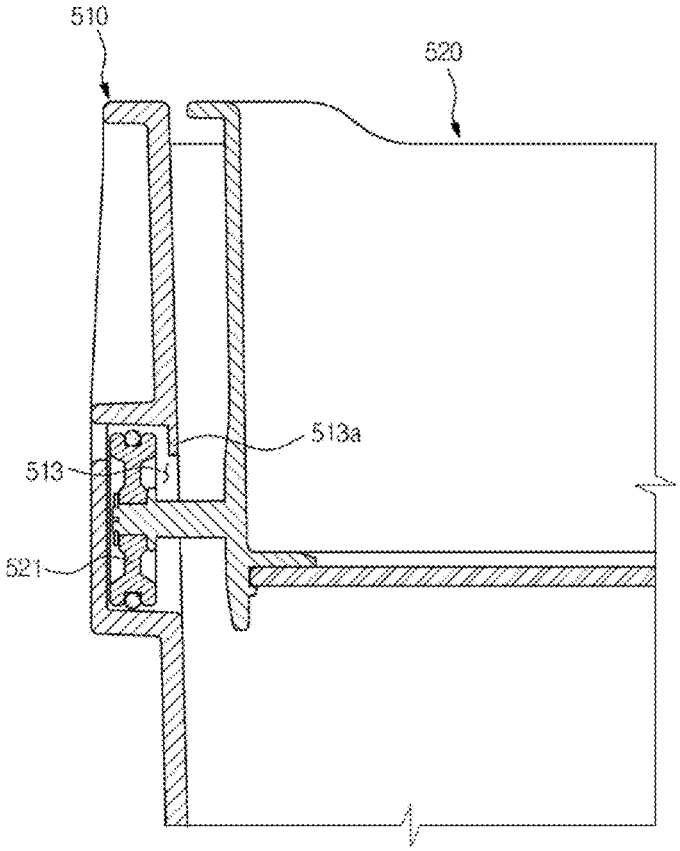

[Fig. 35]
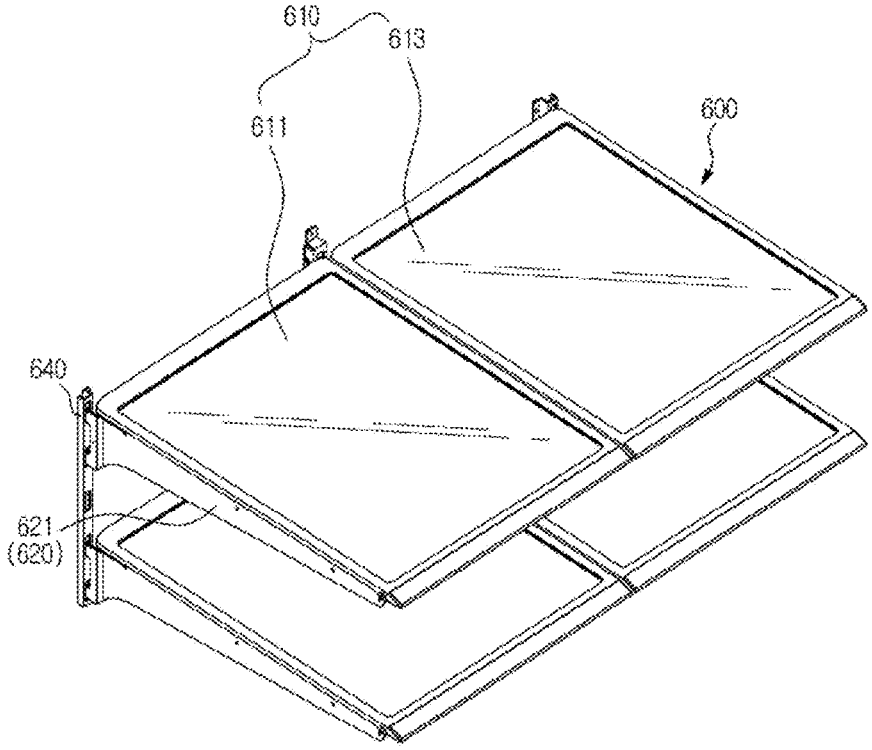

[Fig. 36]
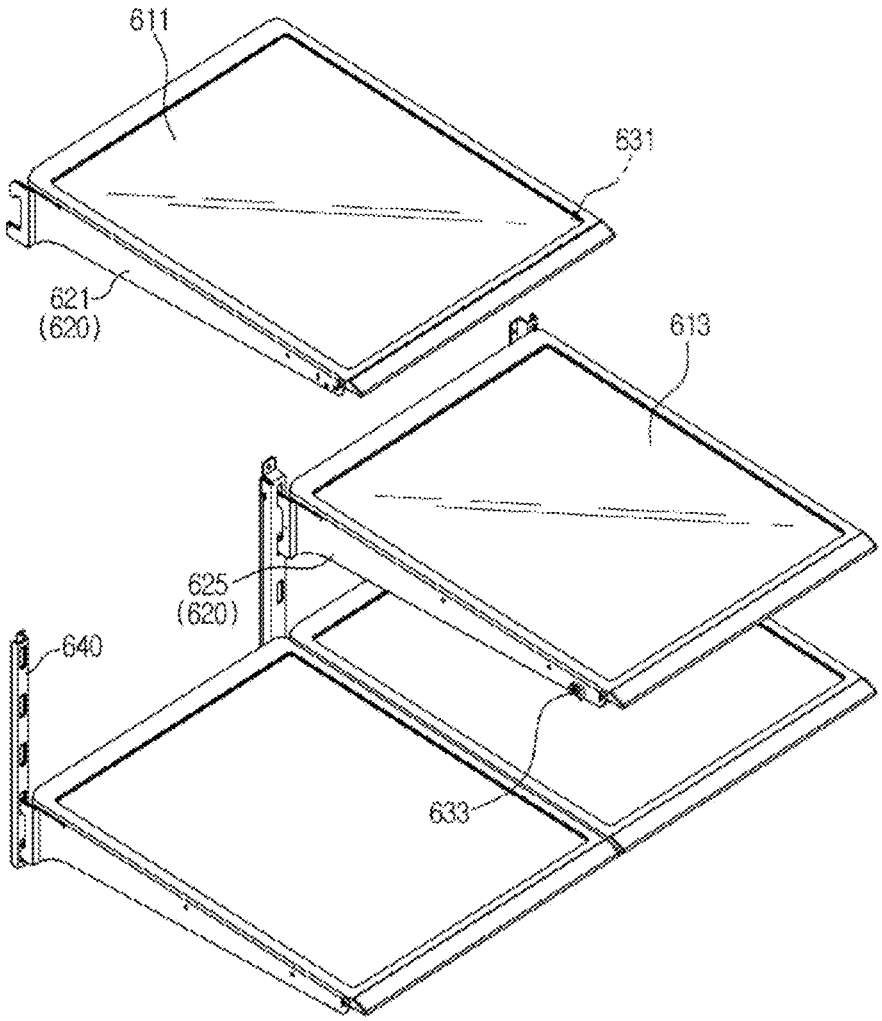

[Fig. 37]
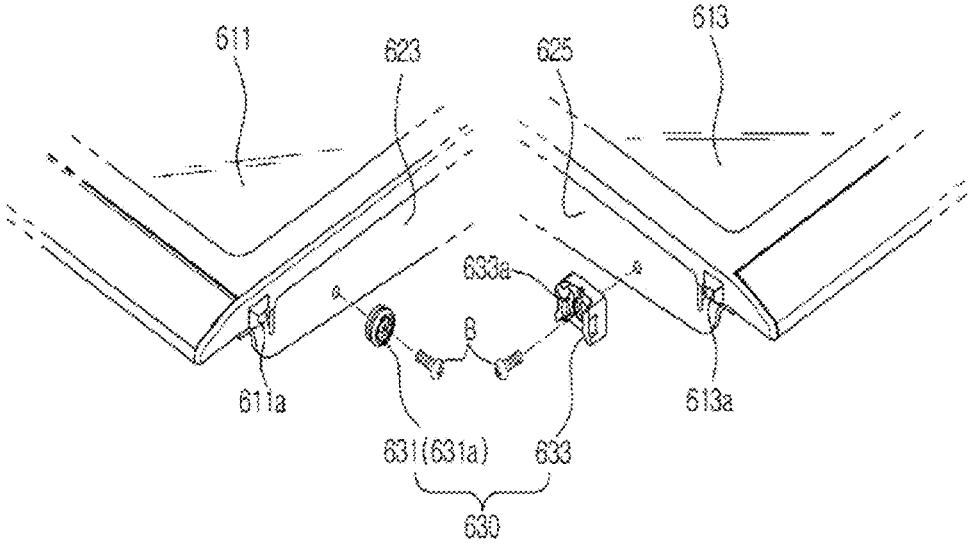
[Fig. 38]
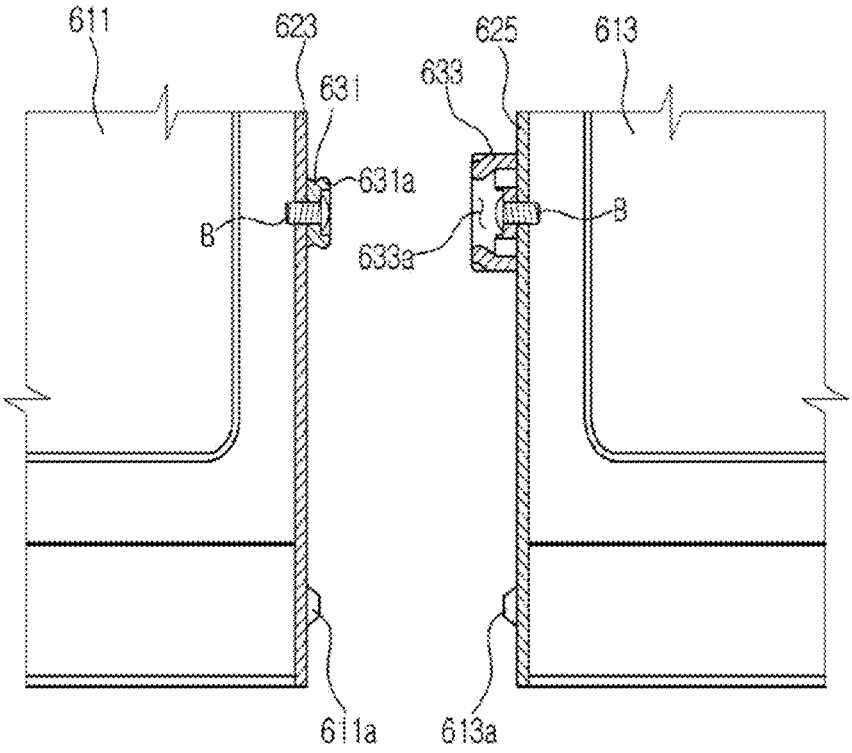

[Fig. 39]
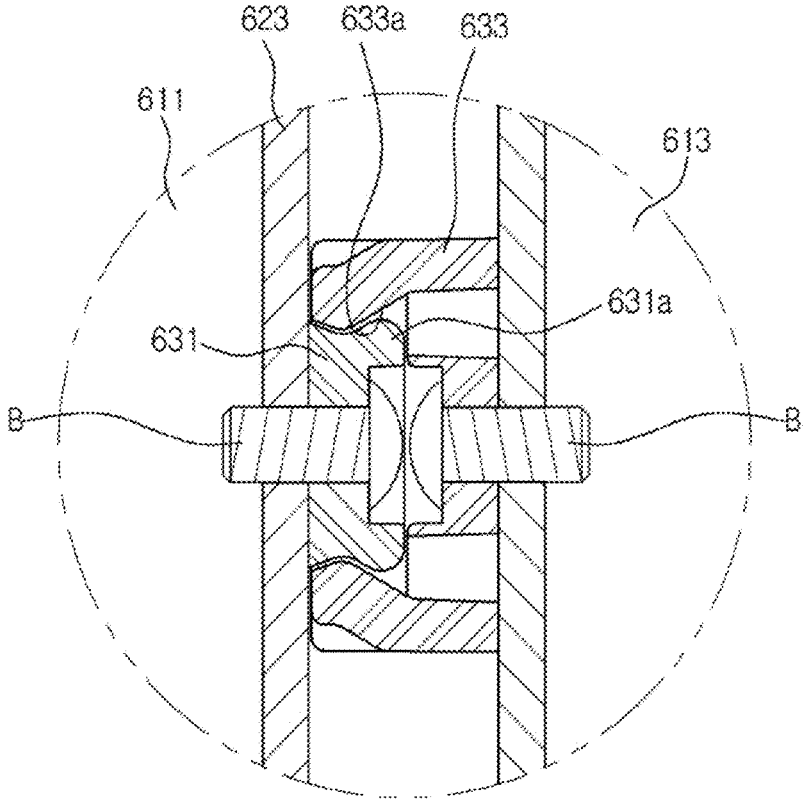

[Fig. 40]
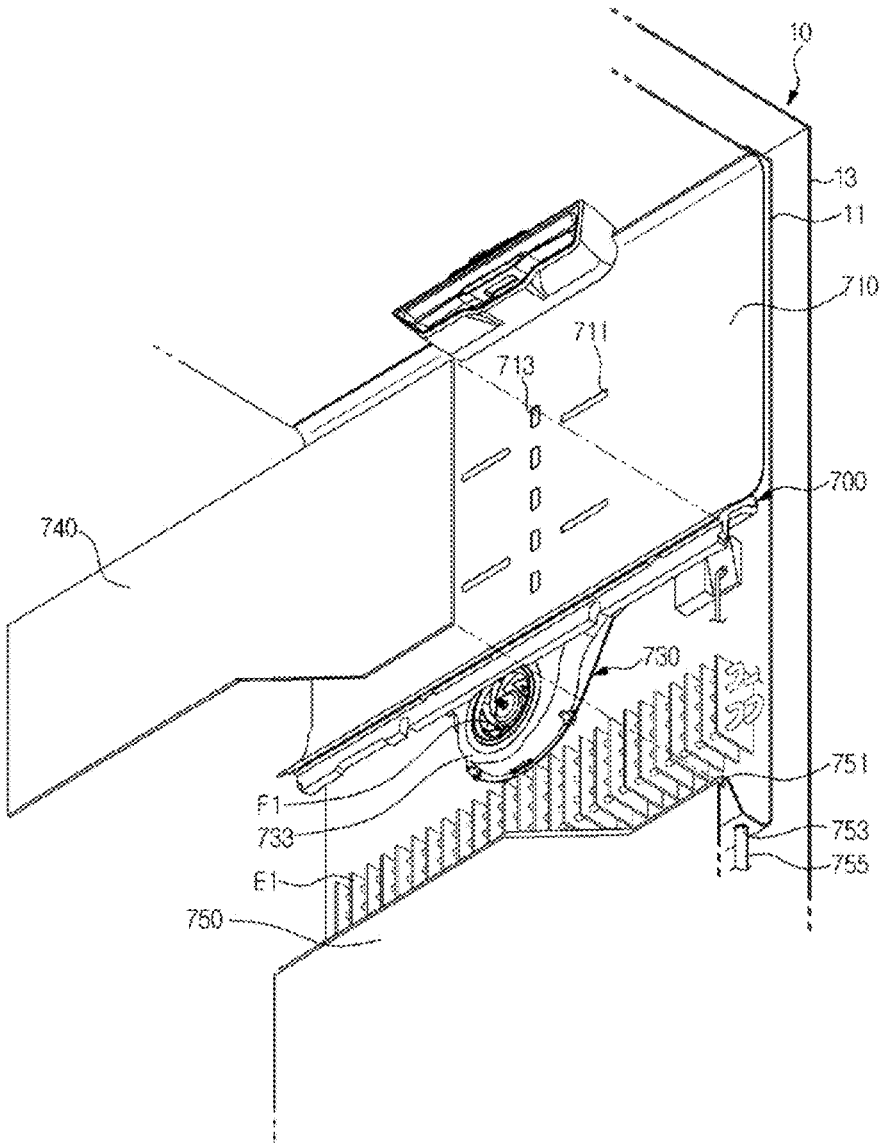

[Fig. 41]
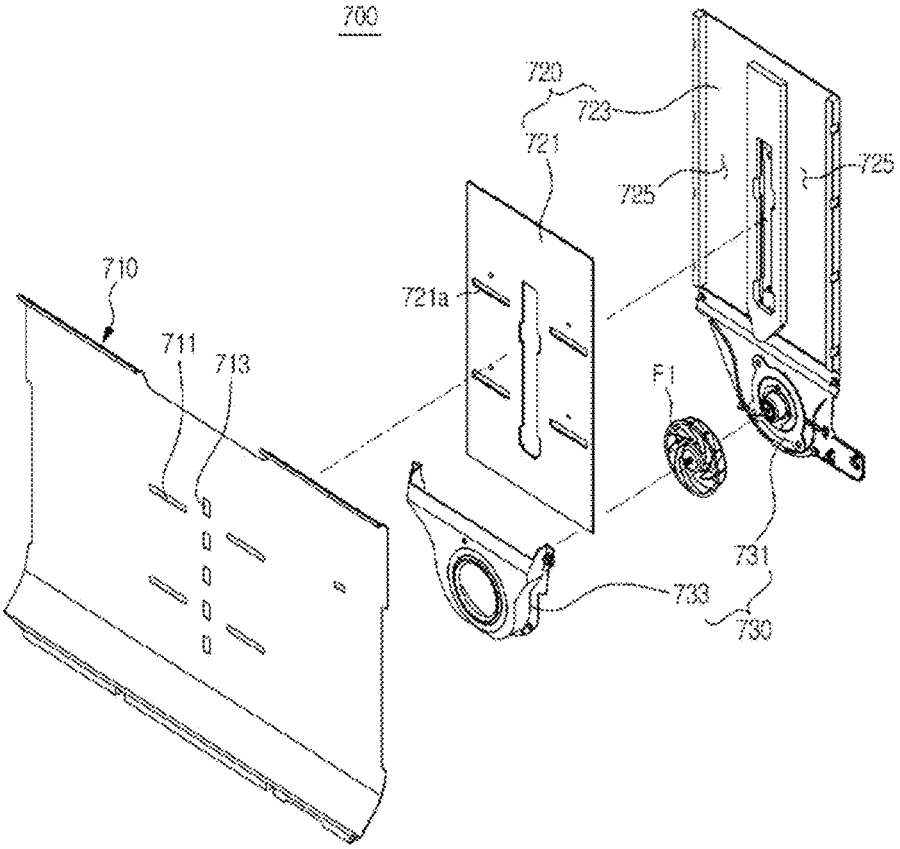

[Fig. 42]
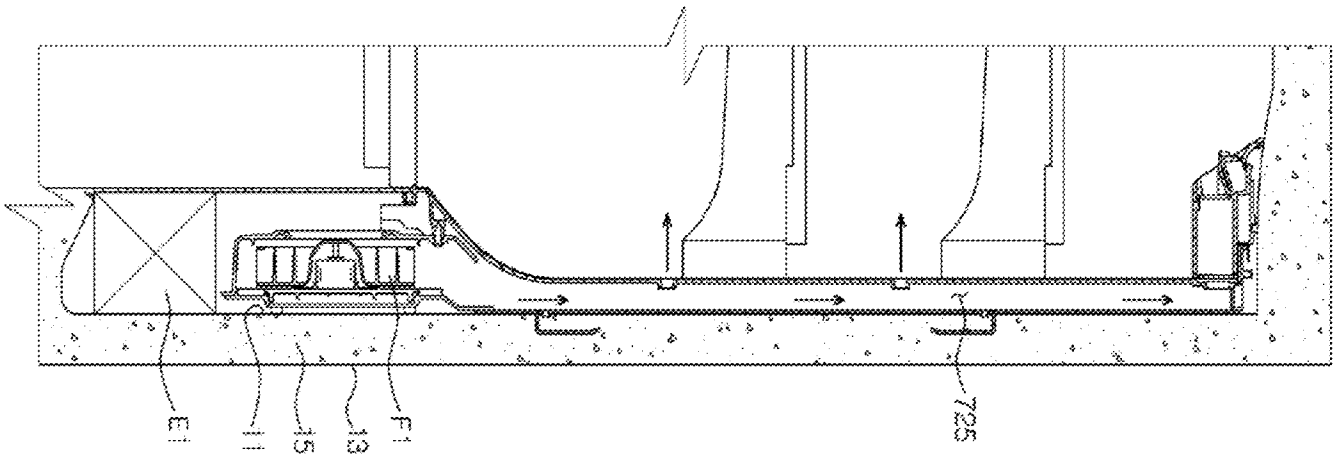

[Fig. 43]
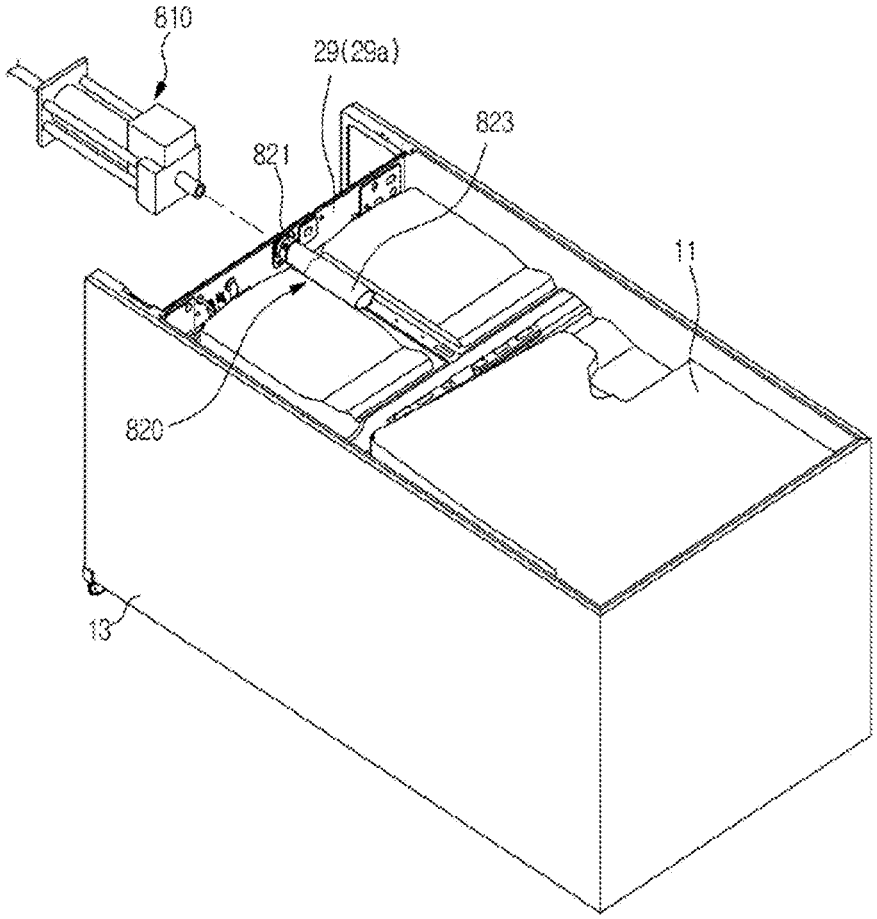

[Fig. 44]
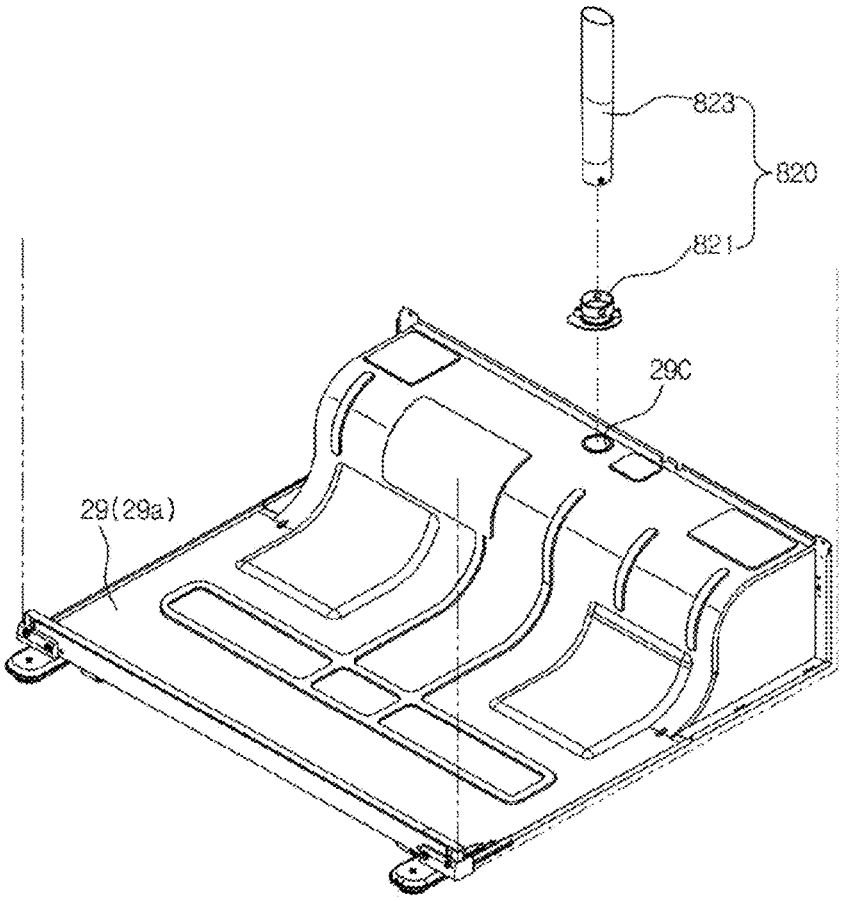

[Fig. 45]
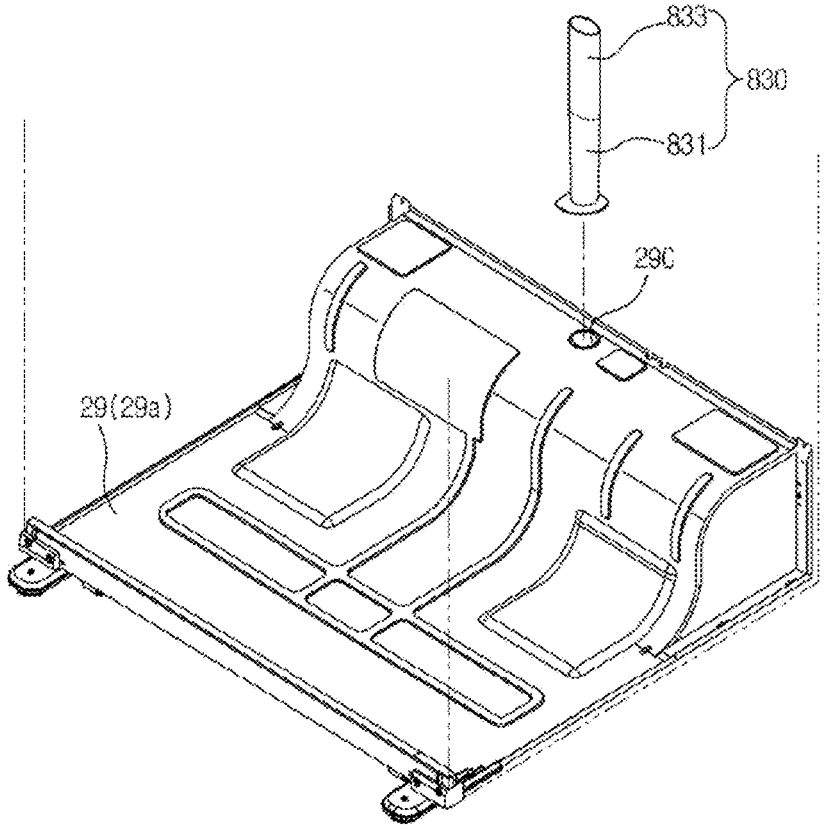

[Fig. 46]
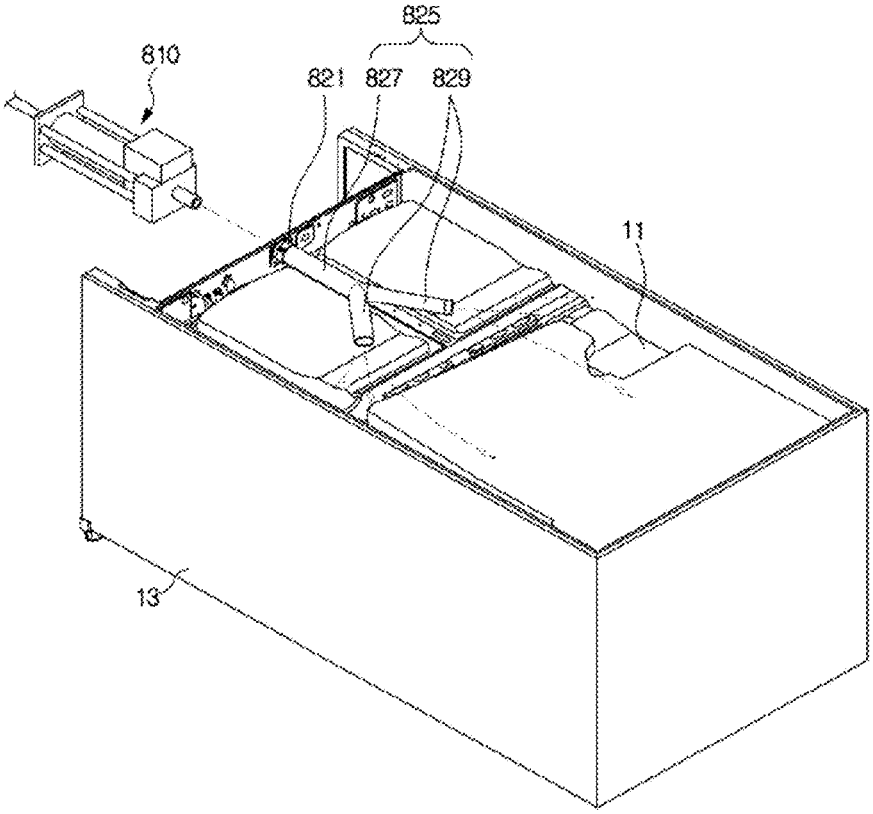

[Fig. 47]
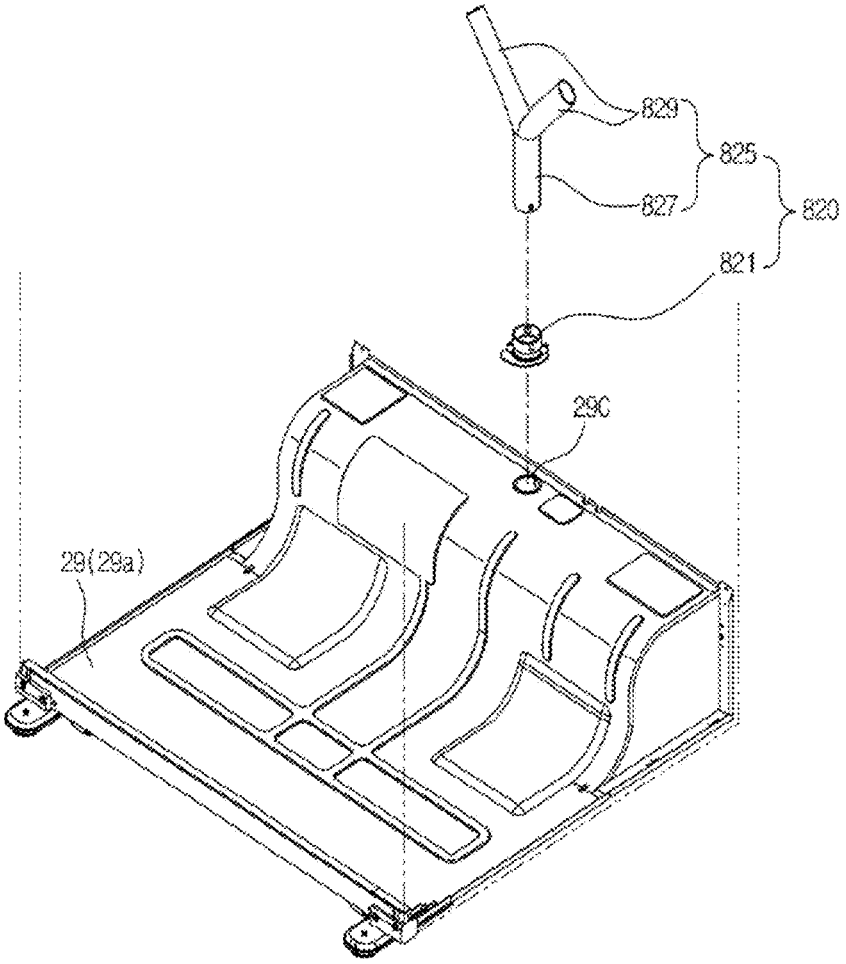

[Fig. 48]
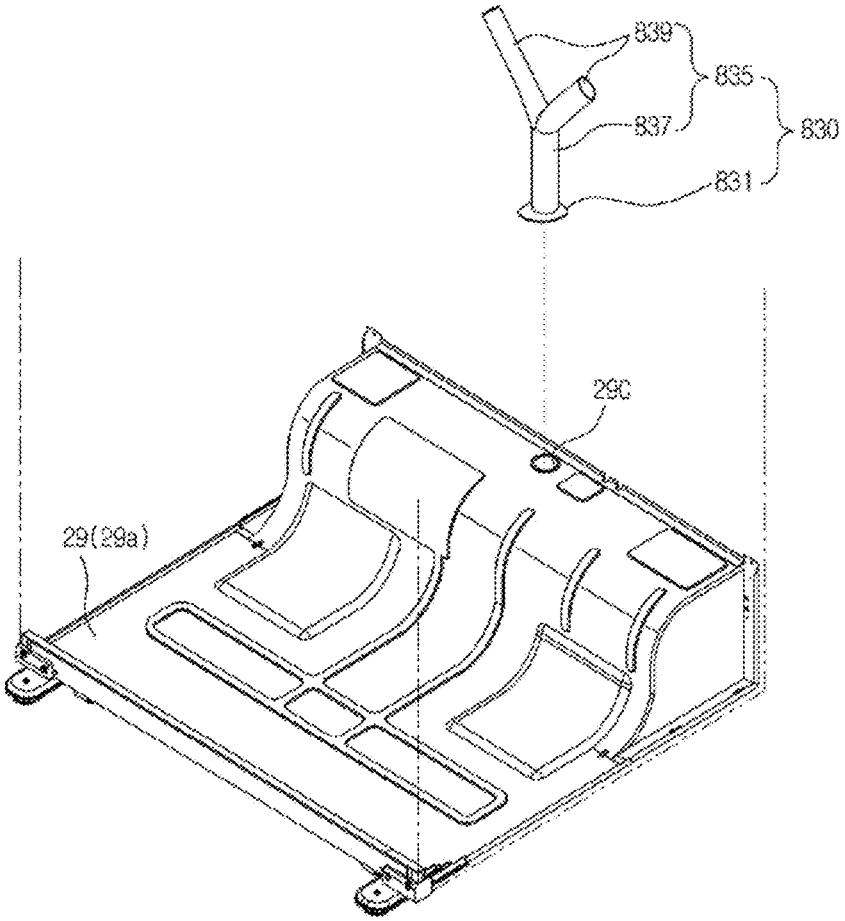

[Fig. 49]
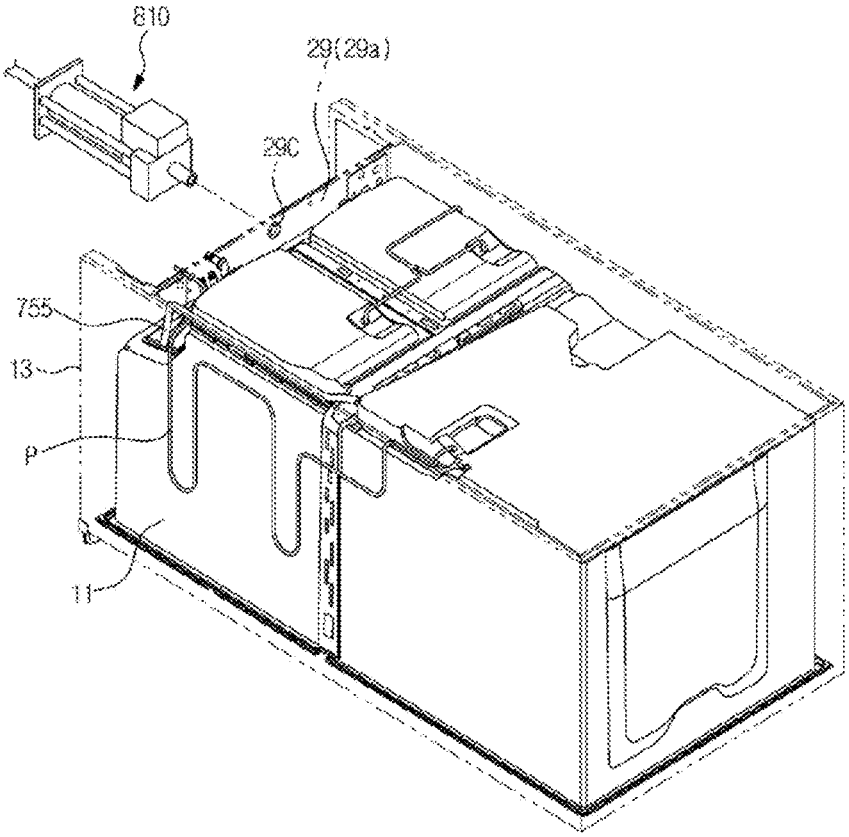

REFRIGERATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *broadening reissue application of U.S. Pat. No. 10,345,036, issued Jul. 9, 2019, which is a* U.S. National Stage Application, which claims the benefit under 35 U.S.C. § 371 of PCT International Patent Application No. PCT/KR2015/000157, filed Jan. 7, 2015 which claims the foreign priority benefit under 35 U.S.C. § 119 of Korean Patent Application No. 10-2014-0002010, filed Jan. 7, 2014, and Korean Patent Application No. 10-2014-0089516, filed Jul. 16, 2014, the contents of which are incorporated herein by reference.

TECHNICAL FIELD

Embodiments of the present disclosure relate to a refrigerator having an improved cool air duct so as to uniformly maintain a temperature of an indoor space of a storage chamber.

BACKGROUND ART

Generally, a refrigerator includes a main body having an inner casing and an outer casing, a storage chamber formed by the inner space, and a cool air supply device to supply cool air to the storage chamber, to thereby store foods in a fresh state.

A temperature of the storage chamber is maintained within a predetermined range needed to store foods in a fresh state.

The storage chamber of the refrigerator has an opened front surface, and the opened front surface is closed by a door in such a manner that a temperature of the storage chamber is properly maintained at ordinary times.

The insulation is foamed between the inner casing and the outer casing of the main body so as to prevent leakage of cool air from the storage chamber.

Since the insulation is foamed at a predetermined temperature or higher, heat occurs in the insulation foaming process, a temperature of the main body may be higher than a room temperature (or normal temperature) by about 20° C. or higher on the condition that the insulation is foamed between the inner casing and the outer casing.

After the insulation is foamed between the inner casing and the outer casing, as a temperature of the main body gradually drops to a room (or normal) temperature, the insulation is hardened or stiffened, and the main body is thermally contracted.

The inner casing may be generally formed of a plastic material, and the outer casing may be generally formed of steel. The degree of thermal contraction of the plastic material may be higher than that of the steel material by about 5 times or higher. As a result, when the main body is thermally contracted, the inner casing is thermally contracted much more than the outer casing. Thus, during a predetermined time in which the temperature of the main body drops to room temperature, the center part of both sides of the main body is modified into a convex shape in an outward direction of the main body. Under the condition that the temperature of the main body drops to the room temperature, the center part of both sides of the main body is modified into a convex shape in an outward direction of the main body such that the insulation is hardened or stiffened.

When deformation occurs in the inner casing and the outer casing due to a difference in thermal contraction between the inner casing and the outer casing, such deformation of the inner casing and the outer casing may be regularly reduced by the insulation contacting each of the inner casing and the outer casing. If thickness of the insulation foamed between the inner casing and the outer casing is reduced so as to implement the same exterior size as well as to increase inner capacity (or inner volume) of the main body, the degree of deformation in which the center part of both sides of the main body is modified into a convex shape in an outward direction of the main body may unavoidably increase. When a refrigerator starts operation upon completion of insulation foam, the internal temperature of the main body is lowered and at the same time the degree of thermal contraction of the inner casing is increased, resulting in an increase in the degree of deformation of the exterior shape.

In addition, if thickness of the insulation is reduced, insulation performance may be deteriorated. Stiffness or rigidity of the inner casing and the outer casing is weakened, such that the main body may be modified in shape not only by a weight of the main body but also by a weight of materials stored in the main body.

In order to improve deteriorated insulation performance caused by a reduced thickness of the insulation, not only the insulation but also a vacuum insulation may be disposed between the inner casing and the outer casing. However, although the vacuum insulation and the insulation are disposed between the inner casing and the outer casing, it is impossible to reinforce weakened stiffness whereas insulation performance is improved.

DISCLOSURE

Technical Problem

An object of the present disclosure is to provide a refrigerator configured to improve main body stiffness, which is decreased as thickness of an insulation material is reduced to increase inner capacity of the main body, using a reinforcement structure, resulting in reduction of deformation of the main body.

Another object of the present disclosure is to provide a refrigerator in which an electronic box including various electronic constituent elements needed to control the operation of the refrigerator is disposed in a hinge cover provided in a forward direction of an upper part of the main body, resulting in improved space utilization (or space occupancy).

Another object of the present disclosure is to provide a refrigerator in which a reinforcement plate formed of steel is contained in the electronic box, such that, although a fire breaks out in constituent elements contained in the electronic box, the refrigerator can prevent the fire from spreading to the outside of the electronic box using the steel reinforcement plate.

Another object of the present disclosure is to provide a refrigerator including an improved cool air duct so as to uniformly maintain a temperature of an indoor space of a storage chamber.

Technical Solution

Accordingly, the present disclosure is directed to a refrigerator that substantially obviates one or more problems due to limitations and disadvantages of the related art.

In accordance with one aspect of the present disclosure, a refrigerator includes a main body, a storage chamber provided in the main body in a manner that a front surface of the storage chamber is opened, an evaporator to supply cool air to the storage chamber, and a cool air duct to form a flow passage in a manner that cool air generated by the evaporator is supplied to the storage chamber, wherein the cool air duct includes a front panel formed of a metal material, which is provided at a back surface of the storage chamber, such that an indoor space of the storage chamber is evenly cooled by cool air of the indoor space of the storage chamber and a uniform temperature is thus maintained in the indoor space of the storage chamber, wherein an upper part of the front panel is formed in a flat panel shape, and a lower part of the front panel is formed in a streamlined shape that is gradually curved in a direction toward a front surface of an upper part of the storage chamber as the lower part of the front panel approaches a lower end of the front panel.

The cool air duct may include the front panel, a cool air flow passage unit disposed at a back surface of the front panel so as to form a first flow passage, a blowing fan mounting unit provided at a lower part of the cool air flow passage unit so as to supply cool air generated by the evaporator to the storage chamber.

The front panel may be configured to have a width corresponding to a width of the storage chamber.

The front panel may be formed of aluminum (Al), and include a plurality of cool air outlets through which the cool air guided through the flow passage is discharged to the inside of the storage chamber.

The blowing fan may be arranged at an upper part of the evaporator, the lower part of the front panel is formed in a streamlined shape so as to accommodate an installation space of the blowing fan.

The lower part of the front panel may include a barrier to form a space in which the evaporator and the blowing fan are installed, and the barrier closely adheres to the lower part of the front panel such that the storage chamber and the space in which the evaporator and the blowing fan are installed are sealed up.

The cool air flow passage unit may include a first cool air flow passage unit disposed at a back surface of the front panel, and a second cool air flow passage unit connected to a back surface of the first cool air flow passage unit such that the flow passage is formed between the first cool air flow passage unit and the second cool air flow passage unit.

The first cool air flow passage unit may include a plurality of discharge holes located at positions corresponding to positions of the plurality of cool air outlets.

The blowing fan mounting unit may be located at a lower part of the cool air flow passage unit, and include a housing to which the blowing fan is rotatably mounted and a cover member to cover an opened front surface of the housing.

A drain unit may configure to drain condensed water generated from the evaporator to the outside is disposed at a lower part of the evaporator.

The drain unit may have a tilted surface that is gradually tilted downward with decreasing distance from a right end of the drain unit on the basis of a center part of the drain unit, and a drain hole through which the condensed water is drained is provided at an end of the tilted surface.

The drain hole may include a drain pipe through which the condensed water is drained to the outside of the main body, and the drain pipe is disposed between an inner casing and an outer casing of a side surface of the main body.

In accordance with another aspect of the present disclosure, a refrigerator includes a main body, a storage chamber provided in the main body in a manner that a front surface of the storage chamber is opened, an evaporator to supply cool air to the storage chamber, a blowing fan to guide the cool air generated by the evaporator such that the cool air is supplied to the storage chamber, and a cool air duct to form a flow passage in a manner that the cool air generated by the evaporator is supplied to the storage chamber, wherein the cool air duct includes a front panel formed of a metal material, which is provided at a back surface of the storage chamber, such that an indoor space of the storage chamber is evenly cooled by cool air of the indoor space of the storage chamber and a uniform temperature is thus maintained in the indoor space of the storage chamber, a cool air flow passage unit disposed at a back surface of the front panel so as to form the flow passage, and a blowing fan mounting unit that is provided at a lower part of the cool air flow passage unit, is connected to the blowing fan, and is formed to protrude farther forward than the cool air flow passage unit.

The front panel may be formed of aluminum (Al), and may have a width corresponding to a width of the storage chamber.

The cool air flow passage unit may include a first cool air flow passage unit disposed at a back surface of the front panel, and a second cool air flow passage unit connected to a back surface of the first cool air flow passage unit such that the flow passage is formed between the first cool air flow passage unit and the second cool air flow passage unit.

A drain unit may configure to drain condensed water generated from the evaporator to the outside is disposed at a lower part of the evaporator.

The drain unit may have a tilted surface that is gradually tilted downward with decreasing distance from a right end of the drain unit on the basis of a center part of the drain unit, and a drain hole through which the condensed water is drained is provided at an end of the tilted surface.

The drain hole may include a drain pipe through which the condensed water is drained to the outside of the main body, wherein the drain pipe is disposed between an inner casing and an outer casing of a side surface of the main body.

In accordance with another aspect of the present disclosure, A refrigerator includes a main body, a storage chamber provided in the main body in a manner that a front surface of the storage chamber is opened, an evaporator to supply cool air to the storage chamber, a blowing fan to guide the cool air generated by the evaporator such that the cool air is supplied to the storage chamber, and a cool air duct to form a flow passage in a manner that the cool air generated by the evaporator is supplied to the storage chamber, wherein the cool air duct includes a front panel formed of a metal material having a width corresponding to a width of the storage chamber, which is provided at a back surface of the storage chamber such that an indoor space of the storage chamber is evenly cooled by cool air of the indoor space of the storage chamber and a uniform temperature is thus maintained in the indoor space of the storage chamber, a cool air flow passage unit disposed at a back surface of the front panel so as to form the flow passage, and a blowing fan mounting unit that is provided at a lower part of the cool air flow passage unit, is connected to the blowing fan, and is formed to protrude farther forward than the cool air flow passage unit.

Advantageous Effects

As is apparent from the above description, the refrigerator according to the embodiments can maintain stiffness or rigidity using a reinforcement structure even when thickness of an insulation material is reduced, resulting in reduction of deformation of a main body of the refrigerator.

An electronic box is disposed in a hinge cover, such that space utilization is improved and a fire occurring in an electronic box is prevented from spreading to the outside of the electronic box.

A heat dissipation pipe is located at the position adjacent to the outer casing of the refrigerator, such that the refrigerator can prevent dew formation and the heat dissipation pipe can be easily fixed to the inner casing of the refrigerator.

A temperature of the indoor space of the storage chamber can be uniformly maintained, resulting in energy savings.

DESCRIPTION OF DRAWINGS

The accompanying drawings, which are included to provide a further understanding of the invention, illustrate embodiments of the invention and together with the description serve to explain the principle of the invention.

FIG. 1 is a perspective view illustrating a refrigerator according to an embodiment of the present disclosure.

FIG. 2 is a cross-sectional view illustrating a side of the refrigerator according to an embodiment of the present disclosure.

FIG. 3 is a front view illustrating the refrigerator according to an embodiment of the present disclosure.

FIG. 4 is a view illustrating a refrigerator in which a reinforcement member is attached to an inner casing according to an embodiment of the present disclosure.

FIG. 5 is a cross-sectional view illustrating a refrigerator in which a first reinforcement member is attached to the inner casing according to an embodiment of the present disclosure.

FIG. 6 is a view illustrating a refrigerator in which a reinforcement member is attached to the outer casing according to an embodiment of the present disclosure.

FIG. 7 is a view illustrating a refrigerator in which a reinforcement member is vertically attached to the inner casing according to an embodiment of the present disclosure.

FIG. 8 is a view illustrating a refrigerator in which a reinforcement frame is coupled to a main body according to an embodiment of the present disclosure.

FIG. 9 is a perspective view illustrating a reinforcement frame according to an embodiment of the present disclosure.

FIG. 10 is an exploded perspective view illustrating an electronic box embedded in a refrigerator according to an embodiment of the present disclosure.

FIG. 11 is an exploded perspective view illustrating the electronic box viewed from the standpoint of a lower part of the refrigerator according to an embodiment of the present disclosure.

FIG. 12 is a perspective view illustrating an electronic box according to an embodiment of the present disclosure.

FIG. 13 is a cross-sectional view illustrating an electronic box mounted to the main body according to an embodiment of the present disclosure.

FIG. 14 is a view illustrating a wire connected to the electronic box according to an embodiment of the present disclosure.

FIG. 15 is a view illustrating that a heat dissipation pipe is disposed in the main body according to an embodiment of the present disclosure.

FIG. 16 is a view illustrating an inner casing including a heat dissipation pipe and an outer casing according to an embodiment of the present disclosure.

FIG. 17 is a view illustrating that the heat dissipation pipe is fixed to the inner casing according to an embodiment of the present disclosure.

FIG. 18 is a view illustrating that a seating unit for seating the heat dissipation pipe therein and fixing grooves for fixing the heat dissipation pipe are mounted to the inner casing according to an embodiment of the present disclosure.

FIG. 19 is a view illustrating that the heat dissipation pipe is disposed in the main body according to an embodiment of the present disclosure.

FIG. 20 is a view illustrating a storage unit disposed in a storage chamber according to an embodiment of the present disclosure.

FIG. 21 is a view illustrating that a sliding shelf is coupled to the inside of the storage chamber according to an embodiment of the present disclosure.

FIG. 22 is a view illustrating that a sliding shelf is coupled to the inside of the storage chamber according to an embodiment of the present disclosure.

FIG. 23 is a view illustrating that a first storage box is coupled to the sliding shelf according to an embodiment of the present disclosure.

FIG. 24 is an enlarged view illustrating that a rail cover of FIG. 23 is connected to a coupling unit.

FIG. 25 is a view illustrating that the sliding shelf is coupled to the first storage box according to an embodiment of the present disclosure.

FIG. 26 is a view illustrating that the sliding shelf viewed from the standpoint of a bottom surface of the refrigerator according to an embodiment of the present disclosure.

FIG. 27 is a view illustrating that a slide unit is pulled out from the sliding shelf shown in FIG. 26.

FIG. 28 is an exploded perspective view illustrating a self-closing device according to an embodiment of the present disclosure.

FIG. 29 is a view illustrating the self-closing device according to an embodiment of the present disclosure.

FIG. 30 is a view illustrating some parts of the self-closing device viewed from the bottom surface of the refrigerator according to an embodiment of the present disclosure.

FIG. 31 is a view illustrating that a first storage box and a second storage box are detached from each other according to an embodiment of the present disclosure.

FIG. 32 is a side view illustrating a storage unit according to an embodiment of the present disclosure.

FIG. 33 is a view illustrating that the second storage box of FIG. 32 moves from one place to another place.

FIG. 34 is a view illustrating that the second storage box is disposed in the first storage box according to an embodiment of the present disclosure.

FIG. 35 is a view illustrating a shelf unit according to an embodiment of the present disclosure.

FIG. 36 is a view illustrating that a first shelf of FIG. 35 is detached from a support unit.

FIG. 37 is a view illustrating that a horizontal maintenance unit is connected to a bracket according to an embodiment of the present disclosure.

FIG. 38 is a view illustrating that a horizontal maintenance unit is connected to a shelf according to an embodiment of the present disclosure.

FIG. 39 is a view illustrating that a fixing protrusion is inserted into a fixing groove according to an embodiment of the present disclosure.

FIG. 40 is a view illustrating the inside of an upper storage chamber according to an embodiment of the present disclosure.

FIG. 41 is an exploded perspective view illustrating a first cool air duct according to an embodiment of the present disclosure.

FIG. 42 is a view illustrating that the first cool air duct is disposed in the refrigerator according to an embodiment of the present disclosure.

FIG. 43 is a view illustrating that a linear guide member is disposed in the refrigerator according to an embodiment of the present disclosure.

FIG. 44 is a view illustrating that the linear guide member of FIG. 43 is connected to an insulation inlet mounted to a cover of a machine room.

FIG. 45 is a view illustrating that another exemplary guide member of FIG. 44 is connected to an insulation inlet mounted to a cover of a machine room.

FIG. 46 is a view illustrating that a Y-shaped guide member is disposed in the refrigerator according to an embodiment of the present disclosure.

FIG. 47 is a view illustrating that the Y-shaped guide member of FIG. 46 is connected to the insulation inlet mounted to the machine room cover.

FIG. 48 is a view illustrating that another exemplary guide member of FIG. 47 is connected to the insulation inlet mounted to the machine room cover.

FIG. 49 is a view illustrating that a refrigerant pipe and a drain pipe are arranged at a side of the main body of the refrigerator according to an embodiment of the present disclosure.

BEST MODE

Reference will now be made in detail to the embodiments of the present disclosure, examples of which are illustrated in the accompanying drawings, wherein like reference numerals refer to like elements throughout.

Referring to FIGS. 1 to 3, the refrigerator may include a main body 10; a plurality of storage chambers 20 each having an opened front surface in the main body 10; a door 30 rotatably coupled to the main body 10 so as to open or close the storage chambers 20; and a hinge unit 40 through which the door 30 is rotatably coupled to the main body 10.

The main body 10 may include an inner casing 11 to form the storage chambers 20; an outer casing 13 to form the exterior appearance of the refrigerator; and a cool air supply device (not shown) to provide the cool air to the storage chambers 20.

The cool air supply device may include a compressor C, a condenser (not shown), an expansion valve (not shown), an evaporator E, a blowing fan F, a cool air duct D, etc. The insulation 15 is foamed between the inner casing 11 and the outer casing 13 of the main body 10 so as to prevent leakage of cool air from the storage chambers 20.

The compressor C, the condenser, the expansion valve, and the evaporator E may be connected through a refrigerant pipe P, and refrigerant may be directed through the refrigerant pipe P.

A machine room 28 may be provided at a rear lower portion of the main body 10, in which the compressor C to compress refrigerant and the condenser to condense the compressed refrigerant are mounted.

The evaporator E may include a first evaporator E1 to supply cool air to an upper storage chamber 21 and a second evaporator E2 to supply cool air to a lower storage chamber 23. The cool air generated by the first evaporator E1 may be supplied to the upper storage chamber 21 through a first blowing fan F1, and the cool air generated by the second evaporator E2 may be supplied to the lower storage chamber 23 through a second blowing fan F2.

The cool air duct D may include a first cool air duct 700 mounted to a back surface of the upper storage chamber 21, and a second cool air duct 760 mounted to a back surface of the lower storage chamber 23. The first cool air duct 700 may form a first flow passage through which cool air generated by the first evaporator E1 is supplied to the upper storage chamber 21 through the first blowing fan F1. The second cool air duct 760 may form a second flow passage 763 through which cool air generated by the second evaporator E2 is supplied to the lower storage chamber 23 through the second blowing fan F2.

A first cool air outlet 711 may be disposed in the first cool air duct 700, such that cool air generated by the first evaporator E1 is supplied to the upper storage chamber 21 through the first cool air outlet 711. A second cool air outlet 761 may be disposed in the second cool air duct 760, such that cool air generated by the second evaporator E2 is supplied to the lower storage chamber 23 through the second cool air outlet 761.

The storage chamber 20 is divided into a plurality of storage chambers by a partition 17. The partition 17 may include a first partition 17a to divide the storage chamber 20 into the upper storage chamber 21 and the lower storage chamber 23, and a second partition 17b to divide the lower storage chamber 23 into a left storage chamber 25 and a right storage chamber 26.

The upper storage chamber 21 from among two storage chambers (i.e., the upper storage chamber 21 and the lower storage chamber 23) separated from each other by the first partition 17a may be used as a refrigerating chamber. The lower storage chamber 23 may be divided into the left storage chamber 25 and the right storage chamber 26 by the second partition 17b, such that the left storage chamber 25 may be used as a freezing chamber and the right storage chamber 26 may be used as both the freezing chamber and the refrigerating chamber.

The above-mentioned partitioning of the storage chamber 20 is merely an example for convenience of description, and the respective storage chambers (21, 25, 26) may be used in a different way from the above-mentioned structure.

A plurality of shelf units 600 may be disposed in the storage chamber 20 such that the storage chamber 20 may be divided into a plurality of storage chambers. A plurality of containers 27 to store foods therein may also be disposed in the storage chamber 20.

The opened front surface of the storage chamber 20 may be opened or closed by the door 30 rotatably coupled to the main body 10, and a plurality of door guards 31 to store foods or the like may be mounted to the back surface of the door 30.

A hinge unit 40 may allow the door 30 to be rotatably coupled to the main body 10. The hinge unit 40 may include an upper hinge 41 connected to an upper part of the main body 10, an intermediate hinge 43 connected to the first partition 17a, and a lower hinge (not shown) connected to a lower part of the main body 10.

Referring to FIGS. 1 to 3, the insulation 15 foamed between the inner casing 11 and the outer casing 13 may be generally formed of urethane. Foaming of the insulation 15 may be performed only at a predetermined temperature or higher.

Since the insulation 15 is foamed at a predetermined temperature or higher, heat is generated in the insulation foaming process, a temperature of the main body 10 may be higher than room temperature by about 20° C. or higher on the condition that the insulation 15 is foamed between the inner casing 11 and the outer casing 13.

After the insulation 15 is foamed between the inner casing 11 and the outer casing 13, as a temperature of the main body 10 gradually drops to a room temperature, the insulation 15 is hardened or stiffened, and the main body 10 is thermally contracted.

The inner casing 11 may be generally formed of a plastic material, and the outer casing 13 may be generally formed of steel. The degree of thermal contraction of the plastic material may be higher than that of the steel material by about 5 times or higher. As a result, when the main body 10 is thermally contracted, the inner casing 11 is thermally contracted much more than the outer casing 13. Thus, during a predetermined time in which the temperature of the main body 10 drops to the room temperature, the center part of both sides of the main body 10 is modified into a convex shape in an outward direction of the main body 10. Under the condition that the temperature of the main body 10 drops to the room temperature, the center part of both sides of the main body 10 is modified into a convex shape in an outward direction of the main body 10 such that the insulation 15 is hardened or stiffened.

In order to implement the same exterior size as well as to increase inner capacity of the main body 10, there is a need to reduce thickness of the insulation 15 foamed between the inner casing 11 and the outer casing 13. In order to supplement insulation performance deterioration caused by thickness reduction of the insulation 15, a vacuum insulation 19 may be disposed between the inner casing 11 and the outer casing 13.

The vacuum insulation 19 may be arranged not only in the insulation 15 foamed between the inner casing 11 and the outer casing 13 of the main body 10, but also in the insulation 15 foamed in the door 30. In addition, the vacuum insulation 19 may be arranged not only in the insulation 15 foamed in the partition 17, but also in the insulation 15 foamed between the machine room cover 29 and the inner casing 11.

When deformation occurs in the inner casing 11 and the outer casing 13 due to a difference in thermal contraction between the inner casing 11 and the outer casing 13, such deformation of the inner casing 11 and the outer casing 13 may be regularly reduced by the insulation 15 contacting each of the inner casing 11 and the outer casing 13. If thickness of the insulation 15 is reduced, the degree of deformation in which the center part of both sides of the main body 10 is modified into a convex shape in an outward direction of the main body 10 may increase in proportion to reduced thickness of the insulation 15.

When a refrigerator starts operation upon completion of foaming of the insulation 15, the internal temperature of the main body 10 is lowered and at the same time the degree of thermal contraction of the inner casing 11 is increased, resulting in an increase of the degree of deformation of the exterior shape.

Therefore, after the insulation 15 is foamed between the inner casing 11 and the outer casing 13, a reinforcement member 100 may be provided at both sides of the main body 10 as shown in FIGS. 4 and 5, such that the reinforcement member 100 may prevent exterior deformation caused by a difference in thermal contraction between the inner casing 11 and the outer casing 13 when the temperature of the main body 10 drops to room temperature.

The reinforcement member 100 may be formed of steel, may be disposed in the insulation 15 between the inner casing 11 and the outer casing 13 from the viewpoint of both sides of the main body 10, and may have sufficient stiffness to prevent shape deformation caused by a difference in thermal contraction between the inner casing 11 and the outer casing 13.

The reinforcement member 100 may be arranged in the horizontal direction or the vertical direction at both sides of the main body 10 according to the flow direction of the insulation 15 foamed between the inner casing 11 and the outer casing 13.

If the insulation 15 is foamed between the inner casing 11 and the outer casing 13 and flows in the direction from the back surface to the front surface of the main body 10, the reinforcement member 100 may be disposed in the horizontal direction at both sides of the main body 10.

If the reinforcement member 100 is disposed in the horizontal direction at both sides of the main body 10, the reinforcement member 100 may include a first reinforcement member 110 arranged at an upper part of the first partition 17a on the basis of the first partition 17a configured to divide the storage chamber 20 into an upper storage chamber 21 and a lower storage chamber 23, and a second reinforcement member 120 disposed at a lower part of the first partition 17a.

The first reinforcement member 110 and the second reinforcement 120 may be attached to the inner casing 11 as shown in FIG. 4, and may also be attached to the outer casing 13 as shown in FIG. 6.

If the first reinforcement member 110 and the second reinforcement member 120 are disposed in the insulation 15 at the spacing between the inner casing 11 and the outer casing 13, the first reinforcement member 110 and the second reinforcement member 120 may be mounted to any of the inner casing 11 and the outer casing 13 without any problems, irrespective of the inner casing 11 and the outer casing 13.

The first reinforcement member 110 disposed at the upper part of the main body 10 may be shorter than the length of a forward-backward direction of both sides of the main body 10, and may have thickness (T1) of about 0.5 mm.

In order to increase a section modulus in a direction in which the inner casing 11 and the outer casing 13 are modified in shape at the spacing between the inner casing 11 and the outer casing 13, it may be preferable that the first reinforcement member 110 may have the height H1.

The first reinforcement member 110 may have a concavo-convex shape that is capable of having the maximum height H without disturbing flow passage of the insulation 15 foamed between the inner casing 11 and the outer casing 13.

The first reinforcement member 110 may be attached to the inner casing 11 or the outer casing 13 by an adhesive such as a double-sided tape. Although not shown in the drawings, a fixing unit to fix the first reinforcement member 110 to the inner casing 11 or the outer casing 13 may be used, such that the first reinforcement member 110 attached either to the inner casing 11 or the outer casing 13 does not move when the insulation 15 is foamed.

A second reinforcement member 120 disposed at a lower part of the main body 10 may be shorter than the length of a forward-backward direction of both sides of the main body 10, and may have thickness (T2) of about 0.5 mm.

In order to increase a section modulus in the direction in which the inner casing 11 and the outer casing 13 are modified in shape at the spacing between the inner casing 11 and the outer casing 13, the first reinforcement member 120 may have the height H2.

In the same manner as in the first reinforcement member 110, although not shown in the drawings, a fixing unit to fix the first reinforcement member 120 to the inner casing 11 or the outer casing 13 may be used, such that the first reinforcement member 110 attached either to the inner casing 11 or the outer casing 13 does not move when the insulation 15 is foamed.

Referring to FIG. 7, if the insulation 15 flows from the upper part to the lower part of the main body 10 because the insulation 15 is foamed between the inner casing 11 and the outer casing 13, a reinforcement member 130 may be vertically disposed at both sides of the main body 10.

If the reinforcement member 130 is vertically disposed at both sides of the main body 10, the reinforcement member 130 may be shorter than the length of the vertical direction (i.e., up-and-down direction) of both sides of the main body 10, and may have thickness of about 0.5 mm.

The reinforcement member 130 vertically disposed at both sides of the main body 10 may be identical in shape to the first reinforcement member 110, and may be longer than the length of the first reinforcement member 110 as necessary.

In the same manner as in the first reinforcement member 110 and the second reinforcement member 120, as shown in FIG. 7, the reinforcement member 130 may be attached to the inner casing 11 from among the inner casing 11 and the outer casing 13. Although not shown in the drawings, the reinforcement member may also be attached to the outer casing from among the inner casing 11 and the outer casing 13.

As described above, as the reinforcement members (100, 130) are disposed between the inner casing 11 and the outer casing 13 of both sides of the main body 10, stiffness is increased, such that deformation of the main body 10 caused by a difference in thermal contraction between the inner casing 11 and the outer casing 13 can be reduced due to the increased stiffness.

Referring to FIGS. 1 to 3, in order to implement the same exterior size as well as to increase inner capacity of the main body 10, thickness of the insulation 15 foamed between the inner casing 11 and the outer casing 13 must be reduced. If thickness of the insulation 15 is reduced, insulation performance may be deteriorated and stiffness is weakened, such that the main body 10 may be modified in shape by the weight of the main body 10 and the weight of materials stored in the main body 10.

In order to increase insulation performance deteriorated by the reduced thickness of the insulation 15, the insulation 15 and a vacuum insulation panel (VIP) 19 may be disposed between the inner casing 11 and the outer casing 13.

The VIP (hereinafter referred to as a vacuum insulation) 19 may have superior insulation performance to the general insulation 15 by about 8 times or higher, and the inside of the VIP 19 is vacuumed to maximize insulation performance.

Although the vacuum insulation 19 and the insulation 15 are disposed between the inner casing 11 and the outer casing 13 so as to supplement deteriorated insulation performance, it may be impossible for the vacuum insulation 19 to supplement reduced stiffness.

Referring to FIGS. 8 and 9, a reinforcement frame 200 may be provided at the front surface of the main body 10 so as to supplement reduced stiffness of the main body 10.

The reinforcement frame 200 may be disposed at the front surface of the inner casing 11 so as to supplement stiffness of the main body 10. The reinforcement frame 200 may include an upper reinforcement frame 20 connected to an upper part of the front surface of the inner casing 11, an intermediate reinforcement frame 220 connected to the center part coupled to a first partition 17a mounted to the front surface of the inner casing 11, a lower reinforcement frame 230 connected to a lower part of the front surface of the inner casing 11, and a first side-surface reinforcement frame 240 and a second side-surface reinforcement frame 250 that are connected to both sides of the front surface of the inner casing 11.

The first side-surface reinforcement frame 240 may be disposed at the upper part of both sides of the front surface of the inner casing 11, and an upper end of the first side-surface reinforcement frame 240 may overlap some parts of the upper reinforcement frame 210 and a lower end of the first side-surface reinforcement frame 240 may extend from the upper end to the spacing between the intermediate reinforcement frame 220 and the lower reinforcement frame 230.

The second side-surface reinforcement frame 250 may be disposed at a lower part of both sides of the front surface of the inner casing 11, and a lower end of the second side-surface reinforcement frame 250 may be connected to the lower reinforcement frame 230 and an upper end of the second side-surface reinforcement frame 250 may extend from the lower end to a specific position spaced apart from the lower end of the first side-surface reinforcement frame 240 by a predetermined distance.

Referring to FIGS. 1 to 3, an electronic box 300 in which electronic constituent elements to control the operation of the refrigerator are contained may be provided in a forward direction of the main body 10.

Referring to FIGS. 10 to 14, the electronic box 300 may include a base 310 to cover an electronic box installation hole 13a provided in the forward direction of the upper part of the main body 10, a cover 320 to cover an upper part of the base 310 in such a manner that a storage space S is provided at the upper part of the base 310, a printed circuit board (PCB) 330 embedded in the storage space S in such a manner that electronic elements 331 are mounted thereon, a PCB mounting unit 340 to which the PCB 330 is mounted, and a reinforcement plate 350 disposed between the PCB mounting unit 340 and the cover 320.

The base 310 may include a base unit 311 connected to a front part of an upper part of the main body 10, and a reception groove 317 to be accommodated in the electronic box installation hole 13a when the base unit 311 is connected to the front part of the upper part of the main body 10.

The base unit 311 may form a border of the reception groove 317 having a square shape, a plurality of fixing hooks 313 may be provided not only at the border of the front part of the reception groove 317, but also at the border of the rear part of the reception groove 317. A wire through-hole 315 may be provided at the rear of both sides of the base unit 311, such that a wire 333 connected to the PCB 330 is connected to the inside of the main body 10 through the wire through-hole 315.

The fixing hook 313 may include a plurality of first fixing hooks 313a provided at the border of the front part of the reception groove 317, and a plurality of second fixing hooks 313b provided at the border of the rear part of the reception groove 317.

The first fixing hook 313a may be inserted into the upper reinforcement frame 210 connected to the upper part of the front surface of the inner casing 11 and then fixed to the upper reinforcement frame 210. The second fixing hook 313b may be inserted into the border of the back surface of the electronic box installation hole 13a, and may then be fixed to the border of the border of the back surface of the electronic box installation hole 13a.

Since the first fixing hook 313a and the second fixing hook 313b contained in the base unit 311 are respectively fixed to the upper reinforcement frame 310 and the border of the back surface of the electronic box installation hole 13a, the base 310 connected to the front part of the upper part of the main body 10 may operate as the outer casing. When the insulation 15 is foamed between the inner casing 11 and the outer casing 13, the base 310 does not move by the foaming pressure and may remain in a fixed state.

The reception groove 317 is accommodated in the electronic box installation hole 13a provided to the front surface of the upper part of the main body 10, such that the reception groove 317 may be recessed at the upper part of the main body.

Since the reception groove 317 is recessed at the upper part of the main body 10, the storage space S disposed between the base 310 and the cover 310 may have a higher height whereas the electronic box 300 provided to the front surface of the upper part of the main body 10 may have a lower height.

The cover 320 is connected to the upper part of the base 310 so that the storage space S may be provided between the base 310 and the cover 320. The cover 320 may include a hinge cover unit 321 to cover the upper part of the upper hinge 41 connected to the upper part of the main body 10 in such a manner that the door 30 is rotatably coupled to the main body 10.

A plurality of PCBs 330 may be used and contained in the storage space S disposed between the base 310 and the cover 320. A plurality of electronic elements 331 may be populated onto the bottom surface of each PCB 330.

The top surface of each of the PCBs 330 does not include the electronic elements 331 and is then mounted to a PCB mounting unit 340, and the PCB mounting unit may be connected to the cover 320.

Since the PCB mounting unit 340 to which the plural PCBs 330 are mounted is connected to the cover 320, the plural PCBs 330 may be located farthest from the upper storage chamber 21 within the storage space S.

Since the plural PCBs 330 are located farthest from the upper storage chamber 21 within the storage space S, heat generated by the electronic elements 331 populated onto the plural PCBs 330 may be maximally prevented from being transferred to the inside of the upper storage chamber 21.

A connector coupling unit 341 may be provided at both sides of the PCB mounting unit 340. A wire connector 335 to which the wire 333 connected to the PCB 330 is fixed may be connected to the connector coupling unit 341.

Therefore, the wire 333 connected to the PCB 330 may be bundled and fixed by the wire connector 335 connected to the connector coupling unit 341, and the wire 333 bundled by the wire connector 335 may be connected to the inside of the main body 10 through the wire through-hole 315 provided to the base 310.

Accordingly, the wire 33 connected to the PCB 330 may pass through the wire through-hole 315 provided to the base 310 through both sides of the PCB mounting unit 340. The wire 333 having passed through the wire through-hole 315 may be connected to the inside of the main body 10 through the hinge hole 41a of the upper hinge 41.

A steel reinforcement plate 350 may be disposed between the cover 320 and the PCB mounting unit 340 to which plural PCBs 330 are mounted.

When impact is applied to the upper part of the electronic box 300, the reinforcement plate 350 reduces the impact applied to the PCBs 330 contained in the storage space S, resulting in protection of the electronic elements 331.

In addition, assuming that a fire breaks out in the electronic elements 331 mounted to the plurality of PCBs 330, the reinforcement plate 350 may prevent the fire from spreading to the outside of the electronic box 330 using the reinforcement plate 350, resulting in reduction of the possibility of causing fire accidents.

Referring to FIGS. 15 to 19, a heat dissipation pipe 400 to prevent dew formation in the outer casing 13 may be provided at the border of the front surface of the inner casing 11 of the main body 10.

If the refrigerator starts operation, cool air flows from the inside of the storage chamber 20 to the outer casing 13 forming the external appearance of the main body 10, such that dew formation may occur in the external surface of the outer casing 13 due to a difference in temperature between the inside and the outside of the outer casing 13.

In order to prevent dew formation in the external surface of the outer casing 13, the heat dissipation pipe 400 in which high-temperature refrigerant flows may be fixed to the border of the front surface of the inner casing 11.

A plurality of seating units 410 in which the heat dissipation pipe 400 is seated may be provided at the border of the front surface of the inner casing 11.

When the inner casing 11 is connected to the outer casing 13, the seating unit 410 provided at the front surface border of the inner casing 11 may be located closest to the outer casing 13.

Since the seating unit 410 is located closest to the outer casing 13, the heat dissipation pipe 400 seated in the seating unit 410 may be located farthest from the inside of the storage chamber 20, and may be located closest to the outer casing 13.

Since the heat dissipation pipe 400 is located farthest from the inside of the storage chamber 20, the possibility that high-temperature heat flows to the inside of the storage chamber 20 by high-temperature refrigerant flowing to the inside of the heat dissipation pipe 400 may be reduced.

If high-temperature heat is transferred to the inside of the storage chamber 20, the internal temperature of the storage chamber 20 increases by high-temperature heat, energy is unavoidably consumed by the increased temperature to reduce the internal temperature of the storage chamber 20.

The heat dissipation pipe 400 is located farthest from the inside of the storage chamber 20, such that the possibility that high-temperature heat is transferred to the inside of the storage chamber 20 is reduced, the increasing width of the internal temperature of the storage chamber 20 is reduced, and energy consumption for reducing the internal temperature of the storage chamber 20 may be reduced.

The heat dissipation pipe 400 is located closest to the outer casing 13, and high-temperature heat caused by high-temperature refrigerant flowing in the heat dissipation pipe 400 is easily transferred to the outer casing 13. Although cool air flows from the inside of the storage chamber 20 to the outer casing 13, a difference in temperature between the inside and the outside is reduced, such that dew formation is prevented from occurring at the external surface of the outer casing 13.

The heat dissipation pipe 400 seated in the seating unit 410 may be fixed to the seating unit 410 by a plurality of clips 430. A fixing groove 420 to which the plurality of clips is fixed may be provided in some parts of the plurality of seating units 410.

The fixing groove 410 may include a first fixing groove 421 and a second fixing groove 423 in which both ends of each clip 430 are respectively inserted. The clip 430 may include a first fixing unit 431 inserted into the first fixing groove and fixed thereto, and a second fixing unit 433 inserted into the second fixing groove and fixed thereto.

The clip 430 may be fixed to the fixing groove 420 in such a manner that the heat dissipation pipe 400 is contained in the clip 430 and the heat dissipation pipe 400 is fixed to the seating unit 410.

Since the heat dissipation pipe 400 is fixed by the clip 430 on the condition that the heat dissipation pipe 400 is seated in the seating unit 410, the heat dissipation pipe 400 may be easily fixed to the border of the front surface of the inner casing 11.

Referring to FIGS. 1 and 2, a storage unit 500 configured to slide in the forward-backward direction may be provided in the storage chamber 20.

The storage unit 500 may be provided in the left storage chamber 25 or the right storage chamber 27 of the lower storage chamber 23. For convenience of description, it is assumed that the storage unit 500 is provided in the right storage chamber 26.

Referring to FIGS. 20 to 27 and FIG. 31, the storage unit 500 may include a first storage box 510 that is supported by both sidewalls of the right storage chamber 26 and slides in the forward-backward direction, a second storage chamber 520 that slides in the forward-backward direction in the inside of the first storage box 510, and a sliding shelf 530 by which the first storage box 510 slides into and out of the right storage chamber 26.

The sliding shelf 530 may be connected to the lower part of the first storage chamber 510, such that the first storage box 510 may slide into or out of the right storage chamber 26.

A coupling unit 26a for coupling the rail cover 550 may be provided at both sidewalls of the right storage chamber 26, and the coupling unit 26a may be integrated with both sidewalls of the right storage chamber 26.

The rail cover 550 slides in the coupling unit 26a such that the rail cover 550 is inserted into the coupling unit 26a.

The installation process of the sliding shelf 530 is as follows. The rail cover 550 of the sliding shelf 530 slides in the coupling unit 26a and is inserted into the coupling unit 26a, and the fastening member B is inserted into the fastening hole 551 provided in the rail cover 550 such that the rail cover 550 is connected to the coupling unit 26a.

If the rail cover 550 is connected to the coupling unit 26a, the slid unit 540 slides out of the right storage chamber 26, and the first storage box 510 is connected to the slide unit 540 in such a manner that the coupling protrusion 541a provided to the slide unit 540 is inserted into the coupling groove 511 of the first storage box 510.

If the first storage box 510 is connected to the slide unit 540, the slide unit 540 is guided along the rail cover 500 according to the sliding scheme, such that the first storage box 510 may slide into and out of the right storage chamber 26.

Since the sliding shelf 530 is connected to the lower part of the first storage box 510, the first storage box 510 is completely pulled out of the right storage chamber 26, such that a user may easily pull out foods or the like from the first storage box 510.

Since the sliding shelf 530 is connected to the lower part of the first storage box 510, the first storage box 510 is not connected to the upper part of the sliding shelf 530, and foods or the like may be directly stored on the sliding shelf 530. In addition, the first storage box 510 is connected to the upper part of the sliding shelf 530, such that foods or the like may be stored in the first storage box 510.

A detailed structure of the sliding shelf will hereinafter be given.

Referring to FIGS. 20 to 27, the sliding shelf 530 may include a rail cover 550 connected to both sidewalls of the right storage chamber 26, a slide unit 540 configured to slide along the rail cover 550, and a self-closing device 560 connected to the slide unit 540 so as to transfer elastic force in the insertion direction of the first storage box 510 such that the first storage box 510 can be easily closed even by weak force.

The slide unit 540 may include a sliding unit 541 connected to a lower part of the first storage box 510, and a slide rail 543 configured to slide along the rail cover 550 at both sides of the sliding unit 541.

A coupling protrusion 541a protruding upward to interconnect the first storage box 510 and the sliding unit 541 may be provided at the upper parts of both sides of the front surface of the sliding unit 541. A coupling groove 511 in which the coupling protrusion 541a is inserted may be provided at the position corresponding to the coupling protrusion 541a in the first storage box 510.

As described above, the rail cover 550 is coupled and fixed to the coupling unit 26a, and may allow the first storage box 510 to slide into and out of the right storage chamber 26.

Referring to FIGS. 26 to 30, the self-closing device 560 may include a case 570 respectively provided at both sides of the sliding unit 541 so as to form the external appearance, an elastic unit 580 disposed in the case 570 to accumulate elastic force when the first storage box 510 slides out as well as to transmit elastic force in the slide-in direction (i.e., the insertion direction) of the first storage box 510 when the first storage box 510 slides in, and an oil damper 590 connected to the elastic unit 580 so as to absorb impact generated when the first storage box 510 slides in.

The elastic unit 5890 may include a slider 581 to perform rectilinear motion within the case 570, a rotator 683 rotatably coupled to the slider 581, and an elastic member 585, both ends of which are respectively connected to the slider 581 and the case 570.

The slider 581 may include a rotation hole 581a rotatably connected to a rotation shaft 583b mounted to the rotator 583, a first fixing groove 581b to which the elastic member 585 is fixed, and a second fixing groove 581c to which the oil damper 590 is fixed.

The slider 581 may perform rectilinear motion along with the rotator 583 along the following guide rail 571. The elastic member 585 fixed to the first fixing groove 581b of the slider 581 is extended through the rectilinear motion, such that the elastic member 585 may accumulate elastic force therein.

The rotator 583 may include a protrusion unit 583a, a rotation shaft 583b, and an engaging groove 583b. The protrusion unit 583a may protrude downward from a lower part of the rotator 583 in a manner that the rotator 583 is guided along the guide rail 571 and the protrusion unit 583 is accommodated in the guide rail 571. The rotation shaft 583b may allow the rotator 583 to be rotatably connected to the slider 581. The engaging groove 583c may receive the engaging member 553 provided to the rail cover 550 such that the engaging member 553 is caught in the engaging groove 583c.

The protrusion unit 583a may protrude toward the guide rail 571 at a lower part of the rotator 583, and may move along the guide rail 571, such that the rotator 583 may be guided along the guide rail 571.

The rotation shaft 583b may be provided at the upper part of the rotator 583 so that the rotation shaft 583b may be rotatably coupled to the rotation hole 581a of the slide 581.

The rotator 583 may rotate about the rotation shaft 583b, may perform rectilinear motion within a predetermined section along with the slider 581, and may then rotate along with the slider 581.

The engaging groove 583c in which the engaging member 553 provided to the rail cover 550 is caught is configured. When the first storage box 510 slides in or out, the rotator 583 configured to move along with the first storage box 510 may move along the guide rail 571.

The engaging member 553 provided to the rail cover 550 fixed to the coupling unit 26a of the right storage chamber 26 may remain in a fixed state. As a result, when the first storage box slides in or out, if the engaging member 553 is caught in the engaging groove 583c of the rotator 583, the rotator 583 moves along the guide rail 571.

The elastic member 585 may be implemented as a spring, and both ends of the elastic member 585 may be respectively fixed to the case 570 and the slider 581.

From among both ends of the elastic member 585, one end fixed to the case 570 may remain in a fixed state, and the other end fixed to the slider 581 may move along with the slider 581 during the rectilinear motion of the slider 581, may extend in length, may return to an original state, and may transmit elastic force to the first storage box 510.

The case 580 is provided at a lower part of the sliding unit 541 so as to form the external appearance, and the elastic unit 580 and the oil damper 590 may be contained in the case 580.

The case 570 may include a guide rail 571 in which the protrusion unit 583a of the rotator 583 is accommodated and moves, a guide unit 573 acting as a passage along which the engaging member 553 moves along with the rotator 583, a fixing unit 575 to which the elastic member 585 is fixed, a first accommodation unit 577 in which the elastic member 585 is accommodated, and a second accommodation unit 579 in which the oil damper 590 is accommodated.

The guide rail 571 is designed to accommodate the protrusion unit 583a mounted to the rotator 583 such that the protrusion unit 583a moves along the guide rail 571. As a result, the guide rail 571 may guide the rotator 583 and the slider 581.

The guide rail 571 may include a straight route 571a along which the rotator 573 performs rectilinear motion in a forward-backward direction, and an engaging unit 571b provided to one end of the straight route 571a in a manner that the rotator 583 is rotated and fixed to the engaging unit 571b.

The guide unit 573 is arranged in parallel to the straight route 571a of the guide rail 571a, and is caught in the engaging groove 583c of the rotator 583, such that the guide unit 573 may guide the engaging member 553 configured to move along with the rotator 583 such that the engaging member 553 can perform rectilinear motion.

The oil damper 590 may include a body unit 591 filled with oil and accommodated in the second accommodation unit 579 of the case 570, and a flowing unit 593 accommodated in the body unit 591 and fixed to the second fixing groove 581c of the slider 581 through one end thereof.

Since one end of the flowing unit 593 is fixed to the slider 581, the flowing unit 593 may move along with the slider 581.

When the first storage box 510 slides in and out, the slider 581 moves along with the first storage box 510 in the same direction as in the first storage box 510. Therefore, when the first storage box slides in, the flowing unit 593 may slide in the body unit 591. When the first storage box 510 slides out, the flowing unit 593 may slide out of the body unit 591.

When the flowing unit 593 slides out of the body unit 591 and then slides into the body unit 591, impact is absorbed by oil filling the body unit 591, such that the elastic unit 580 may be prevented from abruptly moving when the first storage box 510 slides in by elastic force of the elastic unit 580.

Therefore, impact generated when the first storage box 510 abruptly slides in by elastic force of the elastic unit 580 is absorbed, resulting in reduction of noise.

The body unit 591 may maintain the condition in which the body unit 591 is accommodated in the second accommodation unit 579 of the case 570, only the flowing unit 593 moves along with the slider 581, and the engaging projection 579a may be provided in the second accommodation unit 579 in such a manner that the flowing unit 593 slides into the body unit 591 and slides out of the body unit 591.

The engaging projection 579a may be configured to have a space through which the body unit 591 does not pass and only the flowing unit 593 can pass. When the flowing unit 593 moves along with the slider 581, the body unit 591 is caught in the engaging projection 579a such that the body unit 591 is prevented from moving.

The first storage box 510 may slide into and out of the right storage chamber 26 by the sliding shelf 530 according to the sliding scheme.

Referring to FIGS. 31 to 34, the first storage box 510 may include a coupling groove 511 in which the coupling protrusion 531a of the sliding shelf 530 is inserted and coupled, a guide rail 513 to guide the second storage box 520 in a manner that the second storage box 520 slides in the forward-backward direction, and a first storage box knob 515 for allowing the user to grasp the first storage box 510 such that the first storage box 510 slides into or out of the right storage chamber 26.

The guide rail 513 is provided at both sides of the inside of the first storage box 510, such that the second storage box 520 may slide in the forward-backward direction through the guide rail 513.

The guide rail 513 may be recessed outward from the first storage box 510 from the viewpoint of both sides of the inside of the first storage box 510.

The second storage box 520 may be accommodated in the first storage box 510 and may slide in the forward-backward direction. The second storage box 520 may include a roller 521 and a second storage box knob 523. The roller 521 may be guided along the guide rail 513 of the first storage box 510, such that the second storage box 520 may slide in the forward-backward direction in the first storage box 510. The second storage box knob 523 may allow the second storage box to be grasped by the user such that the second storage box 520 may move in the forward-backward direction in the first storage box 510.

The roller 521 may be provided below both sides of the outer surface of the second storage box 520, and may be guided along the guide rail 513 provided in the first storage box 510. A separation prevention projection 513a may be provided at the upper part of the guide rail 513 so as to prevent separation of the roller 521.

Since the second storage box 520 is accommodated in the first storage box 510 and slides in the forward-backward direction, the guide rail 513 provided at both sides of the inside of the first storage box 510 may be spaced downward from the upper border of the first storage box 510 by a separation distance between the upper border of the second storage box 520 and the roller 521.

When the first storage box 510 slides into and out of the right storage chamber 26, the second storage box 520 may slide into and out of the right storage chamber 26 along with the first storage box 510, and the second storage box 520 slides in the forward-backward direction in the indoor space of the first storage box 510, such that the inner space of the first storage box 510 may be efficiently used.

Referring to FIGS. 1 and 2, a plurality of shelf units 600 may be contained in the upper storage chamber 21, such that the upper storage chamber 21 may be divided into a plurality of storage chambers.

Referring to FIGS. 35 to 39, the shelf unit 600 may include a shelf 610 composed of a first shelf 611 and a second shelf 613, a bracket 620 connected to both sides of the first shelf and both sides of the second shelf 613 so as to support the first shelf 611 and the second shelf 613, and a horizontal maintenance unit 630 provided to the bracket 620 in a manner that the first shelf 611 and the second shelf 613 are kept at a horizontal state.

The shelf 610 may include a first shelf 611 located at the left of the upper storage chamber 21, and a second shelf 613 located at the right of the upper storage chamber 21. The first shelf 611 and the second shelf 613 may be kept horizontal, and may divide the upper storage chamber 21 into a plurality of storage chambers.

A first protrusion unit 611a may be provided at the front end of the right side of the first shelf 611, and a second protrusion unit 613a may be provided at the front end of the left side of the second shelf 613 so that the second protrusion unit 613a may be spaced apart from the first protrusion unit 611a.

Under the condition that the first protrusion unit 611a is spaced apart from the second protrusion unit 613a, when the first shelf 611 turns right or the second shelf 613 turns left, the first protrusion unit 611a may contact the second protrusion unit 613a.

If the first shelf 611 turns right, the first protrusion unit 611a may contact the second protrusion unit 613a, such that the first shelf 611 does not turn right any more. If the second shelf 613 turns left, the second protrusion unit 613a may contact the first protrusion unit 611a, such that the second shelf 613 does not turn left any more. As a result, the first shelf 611 and the second shelf 613 may be prevented from escaping from the horizontal state.

The bracket 620 may include a first bracket 621, a second bracket 623, a third bracket 625, and a fourth bracket (not shown). The first bracket 620 may be connected to the left side of the first shelf 611 so as to support the first shelf 611. The second bracket 623 may be connected to the right side of the first shelf 611 so as to support the first shelf 611. The third bracket 625 may be connected to the left side of the second shelf 613 so as to support the second shelf 613. The fourth bracket (not shown) may be connected to the right side of the second shelf 613 so as to support the second shelf 613.

The bracket 620 may be supported by the support unit 640 disposed between the first cool air duct 700 and the inner casing 11 through the shelf unit fixing hole 713 provided in the first cool air duct 700.

Foods and the like may be stacked on the first shelf 611 and the second shelf 613, and stored in the first shelf 611 and the second shelf 613. Categories of foods stacked and stored on the first shelf 611 and the second shelf 613 may be different from each other.

If the type of food stored on the first shelf 611 is different from the type of food stored on the second shelf 613, a weight of food stored on the first shelf 611 is also different from a weight of food stored on the second shelf 613. Accordingly, if the first shelf 611 and the second shelf 613 are used for a long period of time, the first shelf 611 and the second shelf 613 may not maintain the horizontal state and one shelf 610 from among the first shelf 611 and the second shelf 613 may be tilted downward.

As described above, the horizontal maintenance unit 630 may be provided to the bracket 620 configured to support the shelf 610 such that one shelf 610 is not tilted downward and a horizontal state between the first shelf 611 and the second shelf 613 is maintained.

The horizontal maintenance unit 630 may include a first fixing unit 631 and a second fixing unit 633. The first fixing unit 631 may be connected to the second bracket 623 supporting the right side of the first shelf 611. The second fixing unit 633 may be connected to the third bracket 625 supporting the left side of the second shelf 613.

The first fixing unit 633 and the second fixing unit 633 may be respectively connected to the second bracket 623 and the third bracket 625 by the fastening member B. The fixing protrusion 631a may be provided in the first fixing unit 631, and the fixing groove 633a may be provided in the second fixing unit 633.

The first fixing unit 631 may be provided at the right side of the second bracket 623. The second fixing unit 633 may be provided at the left side of the third bracket 625. When a horizontal state between the first shelf 611 and the second shelf 613 is maintained, the fixing protrusion 631a and the fixing groove 633a may be located at matching positions.

Since the fixing protrusion 631a and the fixing groove 633a are located at the matching positions and the fixing protrusion 631a is inserted into the fixing groove 633a and then fixed, the first shelf 611 and the second shelf 613 are kept in the horizontal state when the fixing protrusion 631a is inserted into and fixed to the fixing groove 633a.

Since the fixing protrusion 631a is inserted into and fixed to the fixing groove 633a, only one of the first shelf 611 and the second shelf 613 is prevented from being tilted downward even when different kinds of foods are stored on the first shelf 611 and the second shelf 613 and then used for a long period of time, such that the first shelf 611 and the second shelf 613 may be kept at the horizontal state.

Referring to FIGS. 2 and 4 and FIGS. 40 to 42, the first evaporator E1 and the first blowing fan F1 that are designed to supply cool air to the upper storage chamber 21 may be disposed between the first cool air duct 700 and the inner casing 11.

The first cool air duct 700 may include a front panel 710, a cool air flow passage unit 720, and a first blowing fan mounting unit 730. The front panel 710 may include a plurality of first cool air outlets 711. The cool air flow passage unit 720 may be disposed at the back surface of the front panel 710, and may form a first flow passage 725 through which cool air moves. The first blowing fan mounting unit 730 may be located at a lower part of the cool air flow passage unit 720.

The front panel 710 may be formed of aluminum (Al) in a manner that the front panel 710 is evenly cooled by thermal conduction upon receiving cool air from the upper storage chamber 21, such that the indoor space of the upper storage chamber 21 may uniformly maintain a constant temperature.

The front panel 710 may include a plurality of first cool air outlets 711 and a shelf unit fixing hole 713. Through the first cool air outlets 711, cool air guided through the first flow passage 725 is discharged to the inside of the upper storage chamber 21. The shelf unit fixing hole 713 may be used to fix the shelf unit 600 to the front panel 710.

A lower part of the front panel 710 is formed in a streamlined shape such that the lower part of the front panel 710 is streamlined in the direction toward the upper storage chamber 21. The reason why the lower part of the front panel 710 is formed in the streamlined shape is to form the space in which the first blowing fan (F1) is installed, at the upper part of the first evaporator (E1) adjacent to the first evaporator (E1).

The first blowing fan (F1) is disposed at the lower part of the front panel 710, such that the remaining parts other than the lower part of the front panel 710 may be formed in a flat panel shape.

A barrier 740 may be provided at the lower part of the front panel 710, such that the barrier 740 may form the space in which the first evaporator (E1) and the first blowing fan (F1) are installed, at the lower part of the back surface of the upper storage chamber 21.

Since the barrier 720 may form the space in which the first evaporator (E1) and the first blowing fan (F1) are installed, the barrier 720 may be arranged in a manner that a separation distance between the barrier 720 and the inner casing 11 is longer than a separation distance between the first cool air duct 700 and the inner casing 11.

Accordingly, the upper part of the barrier 740 closely adheres to the lower part of the front panel 710 that is curved in a streamlined shape, such that the space among the first cool air duct 700, the barrier 740, and the inner casing 11 may be sealed from the upper storage chamber 21.

The cool air flow passage unit 720 may include a first cool air flow passage unit 721 and a second cool air flow passage unit 723. The plurality of discharge holes 721a may correspond to the plurality of first cool air outlets 711, and may be disposed at the back surface of the front panel 710. The second cool air flow passage unit 723 is connected to the back surface of the first cool air flow passage unit 721 so that a first flow passage 725 may be formed between the first cool air flow passage unit 721 and the second cool air flow passage unit 723.

The first blowing fan mounting unit 730 may be located at the lower part of the cool air flow passage unit 720. The first blowing fan mounting unit 730 may include a housing 731 mounted to the first blowing fan (F1) to be rotated, and a cover member 733 to cover the opened front surface of the housing 731.

A drain unit 750 configured to drain condensed water generated from the first evaporator (E1) may be provided at a lower part of the first evaporator (E1). The drain unit 750 may have a tilted surface 751 that is gradually tilted downward with decreasing distance from the right side on the basis of the center part of the drain unit 750. A drain hole 753 may be provided at the end of the tilted surface 751.

A drain pipe 755 configured to drain condensed water to the outside of the main body 10 may be provided in the drain hole 753. The drain pipe 755 may be disposed between the inner casing 11 and the outer casing 13 of the right surface of the main body 10.

The drain pipe 755 is disposed between the inner casing 11 and the outer casing 13 of the side surface of the main body 10, instead of being disposed between the inner casing 11 and the outer casing 13 of the back surface of the main body 10. Therefore, when the insulation 15 is foamed in the space between the inner casing 11 and the outer casing 13 of the back surface of the main body 10, flow of the insulation 15 may be facilitated. A structure for foaming the insulation 15 in the space between the inner casing 11 and the outer casing 13 of the back surface of the main body 10 will hereinafter be given with reference to the attached drawings.

Referring to FIGS. 2 and 43, the machine room 28 located at the lower part of the rear side of the main body 10 may be covered by a machine room cover 29.

The machine room cover 29 may include a machine room upper cover 29a to cover the front surface and the upper part of the machine room 28, and a machine room rear cover 29b to cover the back surface of the machine room 28.

As can be seen from the drawings, an insulation inlet 29c may be disposed at the position in which the insulation 15 is foamed in the space between the inner casing 11 and the outer casing 13 of the main body 10, such that the filling space of the insulation 15 will hereinafter be referred to as the space between the inner casing 11 and the outer casing 13 for convenience of description.

However, the insulation inlet 29c may be disposed at the position in which the insulation is foamed in the inside of the door 30.

The insulation 15 is foamed in the space between the inner casing 11 and the outer casing 13 by the foam head 810, such that the space is filled with the insulation 15.

In order to foam the insulation 15 in the space between the inner casing 11 and the outer casing 13, the insulation inlet 29c may be provided at the machine room's upper cover 29a contained in the machine room covers 29 to cover the machine room 28.

From among a spacing between the inner casing 11 and the outer casing 13, the insulation inlet 29c may be provided at the position corresponding to a space toward the back surface of the main body 10 so as to foam the insulation 15 in the space toward the back surface of the main body 10.

The insulation inlet 29c may be provided at the center part of the machine room cover 29 such that the insulation 15 foamed through the insulation inlet 29c may evenly fill the space between the inner casing 11 and the outer casing 13.

In order to foam the insulation 15 in the space between the inner casing 11 and the outer casing 13, a foam head 810 may be connected to the insulation inlet 29c provided to the machine room's upper cover 29a, and a guide member 820 may be connected to the insulation inlet 29c within the space between the inner casing 11 and the outer casing 13.

The foam head 810 may allow the insulation 15 to be foamed into the insulation inlet 29c, such that the insulation 15 may fill the space between the inner casing 11 and the outer casing 13.

Although only one insulation inlet 29c is used and only one foam head 810 is used to correspond to the one insulation inlet 29c as shown in the drawings, the scope or spirit of the present disclosure is not limited thereto, a plurality of insulation inlets may be used and a plurality of foam heads corresponding to the plurality of insulation inlets may also be used.

If the foam head 810 is connected to the insulation inlet 29c and the insulation 15 is then foamed through the insulation inlet 29c, the insulation 15 is foamed in the space between the inner casing 11 and the outer casing 13 through the insulation inlet 29c such that the space is filled with the insulation 15. In the case of using a large-capacity refrigerator and a refrigerator in which a short distance between the inner casing 11 and the outer casing 13 is achieved such that the refrigerator includes a thin insulation thickness wall, flow of the insulation 15 is disturbed by obstacles such as a wire (not shown) contained in the space between the inner casing 11 and the outer casing 13, such that the discharge distance of the insulation is shortened and it is impossible to evenly fill the space between the inner casing 11 and the outer casing 13 with the insulation 15.

In addition, in order to evenly fill the entire space between the inner casing 11 and the outer casing 13 with the insulation 15, the amount of insulation 15 to be foamed in the space between the inner casing 11 and the outer casing 13 must be much larger than a volume corresponding to the space between the inner casing 11 and the outer casing 13, such that an excess insulation 15 should be implanted in the space between the inner casing 11 and the outer casing 11.

If the insulation 15 is excessively implanted into the space between the inner casing 11 and the outer casing 11, the hardening time of the insulation 15 foamed in the space between the inner casing 11 and the outer casing 13 may be delayed. Some parts of the insulation 15 may be exposed to the outside of the space between the inner casing 11 and the outer casing 13, such that the exterior appearance and quality of the refrigerator may be deteriorated. The insulation 15 exposed to the outside of the space between the inner casing 11 and the outer casing 13 needs to be removed, such that the user may feel inconvenienced and the working time for filling the space between the inner casing 11 and the outer casing 13 with the insulation 15 may be extended. If the foam head 810 is unskillfully managed, there may arise a void phenomenon in which crater-shaped pores may occur in the surface of the insulator 15 hardened in the space between the inner casing 11 and the outer casing 13.

In order to address the above-mentioned issues, a guide member 820 may be used, such that the insulation 15 foamed through the foam head 810 may be guided to a part extended by a predetermined section through the space between the inner casing 11 and the outer casing 13, instead of through the insulation inlet 29c, without being disturbed by obstacles or the like.

One end of the guide member 820 may be connected to the insulation inlet 29c in the space between the inner casing 11 and the outer casing 13, and the other end may be extended to the inside of the space between the inner casing 11 and the outer casing 13 such that the insulation 15 foamed through the foam head 810 may be guided.

Referring to FIGS. 43 and 44, the guide member 820 may include a connector 821 connected to the insulation inlet 29c, and a guide pipe 823 connected to the connector 821 such that the guide pipe 823 extends to the space between the inner casing 11 and the outer casing 13.

The guide pipe 823 may be a hollow-type linear pipe, such that the insulation 15 foamed in the foam head 810 may be guided by a length of the guide pipe 823 in the space between the inner casing 11 and the outer casing 13, without being disturbed by obstacles located in the space between the inner casing 11 and the outer casing 13.

Through the guide pipe 823, the initial discharge position of the insulation 15 foamed in the foam head 810 may extend by the length of the guide pipe 823 in the insulation inlet 29c within the space between the inner casing 11 and the outer casing 13.

Since the initial discharge position of the insulation extends from the lower end of the back surface of the main body 10 to the center part, disturbance of the obstacle contained in the space between the inner casing 11 and the outer casing 13 is minimized and high pressure of the insulation 15 is maintained in the guide pipe 823, such that the entire space between the inner casing 11 and the outer casing 13 may be evenly filled with the insulation 15, minimizing the amount of the insulation 15 to be implanted.

In addition, as the insulation 15 is hardened in the space between the inner casing 11 and the outer casing 13 by surface friction generated when the insulation 15 is foamed, the void phenomenon generated on the surface of the insulation 15 may be prevented from occurring, and the amount of the insulation 15 to be implanted may be minimized. As a result the insulation 15 is not exposed to the outside so that the working time can be shortened.

Referring to FIG. 45, the guide member 830 is designed in a manner that the connector 831 and the guide pipe 833 are integrated with each other, such that the guide member 830 may be connected to the insulation inlet 29c.

Excepting that the connector 831 is integrated with the guide pipe 833, the guide pipe 833 is implemented as a hollow-type linear pipe in the same manner as in the guide member 820 shown in FIG. 4, and as such a detailed description thereof will herein be omitted for convenience of description.

Referring to FIGS. 46 and 47, the guide pipe 825 may include a first guide pipe 827 and a second guide pipe 829. The first guide pipe 827 is implemented as the hollow-type linear pipe, and is connected to the connector 821. The second guide pipe 829 may be branched from the first guide pipe 827.

The second guide pipe 829 may allow the insulation 15 having passed through the first guide pipe 827 to be branched in two directions, such that the entire space between the inner casing 11 and the outer casing 13 can be efficiently filled with the insulation 15.

The guide pipe 825 may include the first guide pipe 827 and the second guide pipe 829, and may be formed in a Y-shape having a hollow.

Referring to FIG. 48, the guide member 830 may be designed in a manner that the connector 831 and the guide pipe 835 are integrated with each other, such that the guide member 830 may be connected to the insulation inlet 29c. The guide pipe 835 may be formed in a Y-shape having a hollow.

In the same manner as in the guide pipe 825 shown in FIG. 46, the guide pipe 835 may be formed in a hollow-type linear pipe, such that the guide pipe 835 may include a first guide pipe 837 connected to the connector 831 and a second guide pipe 839 branched from the first guide pipe 837.

As described above, when the insulation 15 is foamed in the space between the inner casing 11 and the outer casing 13, the guide members 820 and 830 may be used not to disturb the flow of the insulation 15. However, instead of using the guide members 820 and 830, the drain pipe 755 for discharging the condensed water generated from either the refrigerant pipe P in which refrigerant flows or the first evaporator E1 to the outside of the main body 10 may be disposed between the inner casing 11 and the outer casing 13 of the side surface of the main body 10. As a result, when the insulation 5 is foamed in the space between the inner casing 11 and the outer casing 13 of the back surface of the main body 10, flow of the insulation 15 is not disturbed.

Although the embodiments of the present invention have been disclosed for illustrative purposes, those skilled in the art will appreciate that various modifications, additions and substitutions are possible, without departing from the scope and spirit of the invention as disclosed in the accompanying claims.

MODE FOR INVENTION

As described above, a related description has sufficiently been discussed in the above "Best Mode" for implementation of the embodiments of the present disclosure. Various embodiments have been described in the best mode for carrying out the invention.

The invention claimed is:

1. A refrigerator comprising:

a main body;

a [storage] *refrigerating* chamber provided [in] *inside* the main body[, the storage chamber having a front surface that is open] *and having an open front side*;

*a freezing chamber provided in the main body;* an evaporator *configured* to [supply] *generate* cool air [to the storage chamber]; [and]

a cool air duct [to form a flow passage to allow cool air generated by the evaporator to be supplied to the storage chamber,] *including:*

[wherein the cool air duct includes:]

a front panel [formed of a metal material, the front panel being disposed at a back surface of the storage chamber, such that an indoor space formed inside of the storage chamber is cooled by the cool air supplied to the storage chamber and a uniform temperature is thus maintained in the indoor space of the storage chamber] *provided in the refrigerating chamber, the front panel forming a portion of a rear interior surface of the refrigerating chamber and being formed of a metal material*, the front panel including:

an upper part formed in a flat panel shape, [and]

a lower part, formed *in a curved shape, that is integrally coupled* to [integrally extend from] the upper part [in a streamlined shape from an end of the upper part of the front panel in a direction toward the front surface of the storage chamber], and wherein the lower part [of the front panel] is formed to [gradually curve] *extend* outward from [the end of the upper part of the front panel in the] *a top end of the lower part in a* direction toward the front [surface] *side* of the [storage] *refrigerating* chamber so that a bottom end of the lower part is [formed to be] closer to the front [surface] *side* of the [storage] *refrigerating* chamber than [a] *the* top end of the lower part,

*a plurality of cool air outlets formed on the front panel,* a cool air flow passage unit disposed [at a back surface] *at a rear side* of the front panel [so as to form the flow passage], *the cool air flow passage unit including:*

*a first part arranged at the rear side of the front panel, and*

*a second part coupled to the first part whereby the first part is between the front panel and the second part, the first part and the second part forming an air flow passage therebetween so that the cool air generated by the evaporator flows through the air flow passage and the cool air is discharged to the refrigerating chamber through openings of the air flow passage at corresponding positions of the plurality of cool air outlets formed on the front panel*;

a fan mounting [member disposed at a lower part of the cool air flow passage unit so as to supply cool air generated by the evaporator to the storage chamber] *portion configured to guide the cool air generated by the evaporator through the air flow passage*;

[wherein the cool air flow passage unit includes:

a first cool air flow passage disposed at a back surface of the front panel, and a second cool air flow passage connected to a back surface of the first cool air flow passage such that the flow passage is formed between the first cool air flow passage and the second cool air flow passage]

*a fan mounted in the fan mounting portion, and*

*a barrier provided at the lower part of the front panel, the barrier forming a portion of the rear interior surface of the refrigerating chamber,*

*wherein the evaporator and the fan are disposed at a rear side of the barrier.*

2. The refrigerator according to claim 1, wherein the front panel is configured to have a width corresponding to a width of the [storage] *refrigerating* chamber.

[3. The refrigerator according to claim 2, wherein the front panel is formed of aluminum (Al), and includes a plurality of cool air outlets through which the cool air guided through the flow passage is discharged to an inside of the storage chamber.]

4. The refrigerator according to claim [3] *1*, [comprising a fan, wherein the fan is arranged at an upper part of the evaporator, the lower part of the front panel is formed to accommodate an installation space of the fan] *wherein the fan mounting portion includes:*

*a housing configured to be mounted to a lower side of the cool air flow passage unit,*

*a cover member configured to cover the housing, the cover member having an opening such that the fan is exposed through the opening of the cover member.*

5. The refrigerator according to claim [4] *1*, wherein [the lower part of the front panel includes:

a barrier to form a space in which the evaporator and the fan are installed, wherein the barrier closely adheres to the lower part of the front panel such that the storage chamber and the space in which the evaporator and the fan are installed are sealed up] *each of the openings of the air flow passage of the air flow passage are aligned with the plurality of cool air outlets of the front panel, respectively.*

[6. The refrigerator according to claim 1, wherein the first cool air flow passage includes: a plurality of discharge holes located at positions corresponding to positions of the plurality of cool air outlets.]

7. The refrigerator according to claim [6] *1*, wherein[:

the fan mounting member is located at a lower part of the cool air flow passage unit, and includes a housing to which a fan is rotatably mounted and a cover member to cover an opened front surface of the housing] *the barrier is configured to protrude toward the refrigerating chamber such that a separation distance between the barrier and the open front side is shorter than a separation distance between the front panel and the open front side.*

8. The refrigerator according to claim [7, wherein:

a drain member configured to drain condensed water generated from the evaporator to the outside is disposed at a lower part of the evaporator] *1, further comprising*

*a shelf unit provided in the refrigerating chamber, the shelf unit disposed above the barrier.*

9. The refrigerator according to claim [8] *1*, [wherein] *further comprising*:

[the drain member has a tilted surface that is gradually tilted downward with decreasing distance from a right end of the drain member on the basis of a center part of the drain member, and a drain hole through which the condensed water is drained is provided at an end of the tilted surface]

*a shelf unit including a shelf and a bracket to support the shelf,*

*a support unit disposed between the cool air duct and an inner casing of the main body to support the bracket through a fixing hole,*

*wherein the fixing hole is disposed between the plurality of cool air outlets of the front panel.*

10. The refrigerator according to claim [9] *1*, [wherein] *further comprising*:

[the drain hole includes a drain pipe through which the condensed water is drained to the outside of the main body, wherein the drain pipe is disposed between an inner casing and an outer casing of a side surface of the main body]

*a drain portion configured to drain condensed water generated from the evaporator which is disposed at a lower part of the evaporator,*

*wherein the drain portion has a tilted surface gradually tilted downward, and a drain hole through which condensed water is drained is provided at an end of the tilted surface.*

11. A refrigerator comprising:

a main body;

a [storage] *refrigerating* chamber provided in the main body[, the storage chamber having a front surface that is open] *and having an open front side*;

*a freezing chamber in the main body;* an evaporator *configured* to [supply] *generate* cool air [to the storage chamber];

a fan [to guide the cool air generated by the evaporator such that the cool air is supplied to the storage chamber; and] *provided at an upper side of the evaporator and configured to blow the cool air generated by the evaporator;* a cool air duct [to form a flow passage to allow the cool air generated by the evaporator to be supplied to the storage chamber,] *including:*

[wherein the cool air duct includes:]

a front panel [formed of a metal material] *provided in the refrigerating chamber, the front panel forming a portion of a rear interior surface of the refrigerating chamber, being formed of a metal material and including a plurality of cool air outlets,*

[the front panel being disposed at a back surface of the storage chamber, such that an indoor space formed inside of the storage chamber is cooled by the cool air supplied to the storage chamber and a uniform temperature is thus maintained in the indoor space of the storage chamber;]

a cool air flow passage unit disposed [at a back surface of the front panel so as to form the flow passage;] *at a rear side of the front panel, the cool air flow passage unit including:*

*a first part disposed at the rear side of the front panel, and*

*a second part coupled to a rear side of the first part whereby the first part is between the front panel and the second part, the first part and the second part forming an air flow passage therebetween so that the cool air generated by the evaporator flows through the air flow passage and the cool air is discharged to the refrigerating chamber through openings of the air flow passage at corresponding positions of the plurality of cool air outlets formed on the front panel;* and a fan mounting [member that is provided at a lower part of the cool air flow passage unit, is connected to the fan] *portion to which the fan is mounted, provided at a lower side of the cool air flow passage unit*, the fan mounting [member] *portion* being formed to [protrude farther] *be connectable to the lower side of the cool air flow passage unit so that while the fan mounting portion is connected to the lower side of the cool air flow passage unit, the fan mounting portion protrudes* forward [than the cool air flow passage unit] *toward the front side of the refrigerating chamber* where a distance between the fan mounting [member] *portion* and the front [surface] *side* of the [storage] *refrigerating* chamber is less than a distance between the [cooling air] *cool air* flow passage *unit* and the front [surface] *side* of the [storage] *refrigerating* chamber, *and*

[wherein the cool air flow passage unit includes:

a first cool air flow passage disposed at a back surface of the front panel; and a second cool air flow passage connected to a back surface of the first cool air flow passage such that the flow passage is formed between the first cool air flow passage and the second cool air flow passage]

*a barrier provided at a lower side of the front panel, the barrier forming a portion of the rear interior surface of the refrigerating chamber,*

*wherein the evaporator and the fan are disposed at a rear side of the barrier.*

12. The refrigerator according to claim 11, wherein the [front panel is formed of aluminum (Al), and has a width corresponding to a width of the storage chamber] *the first part includes an opening arranged to correspond with a cool air outlet of the front panel, such that the cool air generated by the evaporator is discharged to an inside of the refrigerating chamber via the opening and the cool air outlet.*

13. The refrigerator according to claim 11, wherein *the fan mounting portion includes*:

[a drain member configured to drain condensed water generated from the evaporator to the outside is disposed at a lower part of the evaporator]

*a housing to accommodate the fan, and*

*a cover configured to cover the housing and having an opening such that the fan is exposed through the opening of the cover.*

14. The refrigerator according to claim [13] *11*, [wherein:

the drain member has a tilted surface that is gradually tilted downward with decreasing distance from a right end of the drain member on the basis of a center part of the drain member, and a drain hole through which the condensed water is drained is provided at an end of the tilted surface]

*wherein a separation distance between the barrier and the front side is shorter than a separation distance between the cool air flow passage unit and the front side.*

15. The refrigerator according to claim [14] *11*, [wherein:] *further comprising a drain member disposed at a lower part*

*of the evaporator, the drain member configured to drain condensed water generated from the evaporator to an outside,*

[the drain hole includes] *wherein the drain member includes:*

*a tilted surface gradually tilted downward;*

*a drain hole through which the condensed water is drained, provided at an end of the tilted surface; and* a drain pipe [through which] *configured to drain* the condensed water [is drained] to the outside of the main body[, wherein the drain pipe is disposed between an inner casing and an outer casing of a side surface of the main body].

*16. A refrigerator comprising:*

*a body including an inner casing to form a refrigerating chamber and a freezing chamber and an outer casing to form an exterior appearance of the refrigerator;*

*an evaporator configured to generate cool air;*

*a fan provided at an upper side of the evaporator and configured to blow the cool air generated by the evaporator;*

*a cool air duct including:*

*a front panel formed of a metal material, to form an upper portion of a rear interior surface of the refrigerating chamber, the front panel including a plurality of cool air outlets;*

*a cool air flow passage unit disposed between the front panel and the inner casing, the cool air flow passage unit including:*

*a first part disposed at a rear side of the front panel, and*

*a second part coupled to a rear side of the first part whereby the first part is between the front panel and the second part, the first part and the second part forming an air flow passage therebetween so that the cool air generated by the evaporator flows through the air flow passage and the cool air is discharged to the refrigerating chamber through openings of the air flow passage at corresponding positions of the plurality of cool air outlets formed on the front panel, and*

*a fan mounting portion provided at a lower side of the cool air flow passage unit, the fan mounting portion being connectable to the cool air flow passage unit so that while the fan mounting portion is connected to the lower side of the cool air flow passage unit, the fan mounting portion is formed to protrude forward toward a front side of the refrigerating chamber where a distance between the fan mounting portion and the front side of the refrigerating chamber is less than a distance between the cool air flow passage unit and the front side of the refrigerating chamber,*

*a barrier covering the evaporator and the fan mounting portion, the barrier forming a lower portion of the rear interior surface of the refrigerating chamber,*

*wherein the evaporator and the fan are disposed at a rear side of the barrier.*

*17. The refrigerator according to claim 16, wherein a separation distance between the barrier and the inner casing is longer than a separation distance between the cool air flow passage unit and the inner casing.*

*18. The refrigerator according to claim 16, wherein the fan mounting portion includes:*

*a housing to accommodate the fan; and*

*a cover member configured to cover a portion of the fan, the cover member having an opening such that the fan is exposed through the opening of the cover member,*

*wherein the cover member protrudes forward than the cool air flow passage unit.*

*19. The refrigerator according to claim 16, wherein the first part includes a plurality of openings arranged to correspond with a plurality of cool air outlets of the front panel, such that the cool air generated by the evaporator is discharged to an inside of the refrigerating chamber via the plurality of openings and the plurality of cool air outlets.*

*20. The refrigerator according to claim 16, further comprising:*

*a drain portion configured to drain condensed water generated from the evaporator which is disposed at a lower part of the evaporator,*

*wherein the drain portion has a tilted surface gradually tilted downward, and a drain hole through which condensed water is drained is provided at an end of the tilted surface.*

*21. The refrigerator according to claim 16, further comprising a shelf unit to divide the refrigerating chamber horizontally and a support unit disposed between the cool air duct and the inner casing of the body,*

*wherein the shelf unit is supported by the support unit via a shelf unit fixing hole of the cool air duct.*

*22. The refrigerator according to claim 21, wherein the air flow passage includes a first air flow passage and a second air flow passage that are formed such that the shelf unit fixing hole is disposed between the first air flow passage and the second air flow passage.*

* * * * *